US008230137B2

(12) United States Patent
Araki

(10) Patent No.: US 8,230,137 B2
(45) Date of Patent: Jul. 24, 2012

(54) NETWORK PROCESSOR, RECEPTION CONTROLLER AND DATA RECEPTION PROCESSING METHOD PERFORMING DIRECT MEMORY ACCESS TRANSFER

(75) Inventor: Kotaro Araki, Kanagawa (JP)

(73) Assignee: Renesas Electronics Corporation, Kawasaki-Shi, Kanagawa (JP)

(*) Notice: Subject to any disclaimer, the term of this patent is extended or adjusted under 35 U.S.C. 154(b) by 41 days.

(21) Appl. No.: 12/659,346

(22) Filed: Mar. 4, 2010

(65) Prior Publication Data

US 2010/0312924 A1  Dec. 9, 2010

(30) Foreign Application Priority Data

Mar. 6, 2009  (JP) ................................. 2009-054214

(51) Int. Cl.
  *G06F 13/28* (2006.01)
(52) U.S. Cl. .......................................... 710/28; 710/22
(58) Field of Classification Search .................... 710/22, 710/28
  See application file for complete search history.

(56) References Cited

U.S. PATENT DOCUMENTS

| 6,963,946 B1* | 11/2005 | Dwork et al. ................. 710/310 |
| 7,440,469 B2* | 10/2008 | Oner ............................. 370/419 |
| 7,464,197 B2* | 12/2008 | Ganapathy et al. ............. 710/22 |
| 2008/0147902 A1* | 6/2008 | Ishii et al. ........................ 710/19 |
| 2009/0031054 A1* | 1/2009 | Kato ............................... 710/22 |

FOREIGN PATENT DOCUMENTS

JP    6-96007    4/1994

\* cited by examiner

*Primary Examiner* — Chun-Kuan Lee
*Assistant Examiner* — Ronald Modo
(74) *Attorney, Agent, or Firm* — McGinn IP Law Group, PLLC

(57) ABSTRACT

A network processor is connected to an external memory which includes storage areas for storing received data, and stores descriptors specifying locations of the storage areas, respectively. The network processor includes a descriptor storage circuit for storing a plurality of descriptors out of the descriptors; a DMA control circuit configured to transfer the plurality of descriptors from the external memory to the descriptor storage circuit through DMA transfer, transfer the received data to the storage areas in the external memory through DMA transfer on a basis of the plurality of descriptors stored in the descriptor storage circuit upon receipt of the received data, and generate a reception status indicating a condition of the received data each time the received data is transferred to the external memory through DMA transfer, a reception status storage circuit for storing the reception status; and a reception status combination control circuit for combining the reception statuses which are stored in the reception status storage circuit. The DMA control circuit transfers the combined reception statuses to the external memory through DMA transfer.

17 Claims, 13 Drawing Sheets

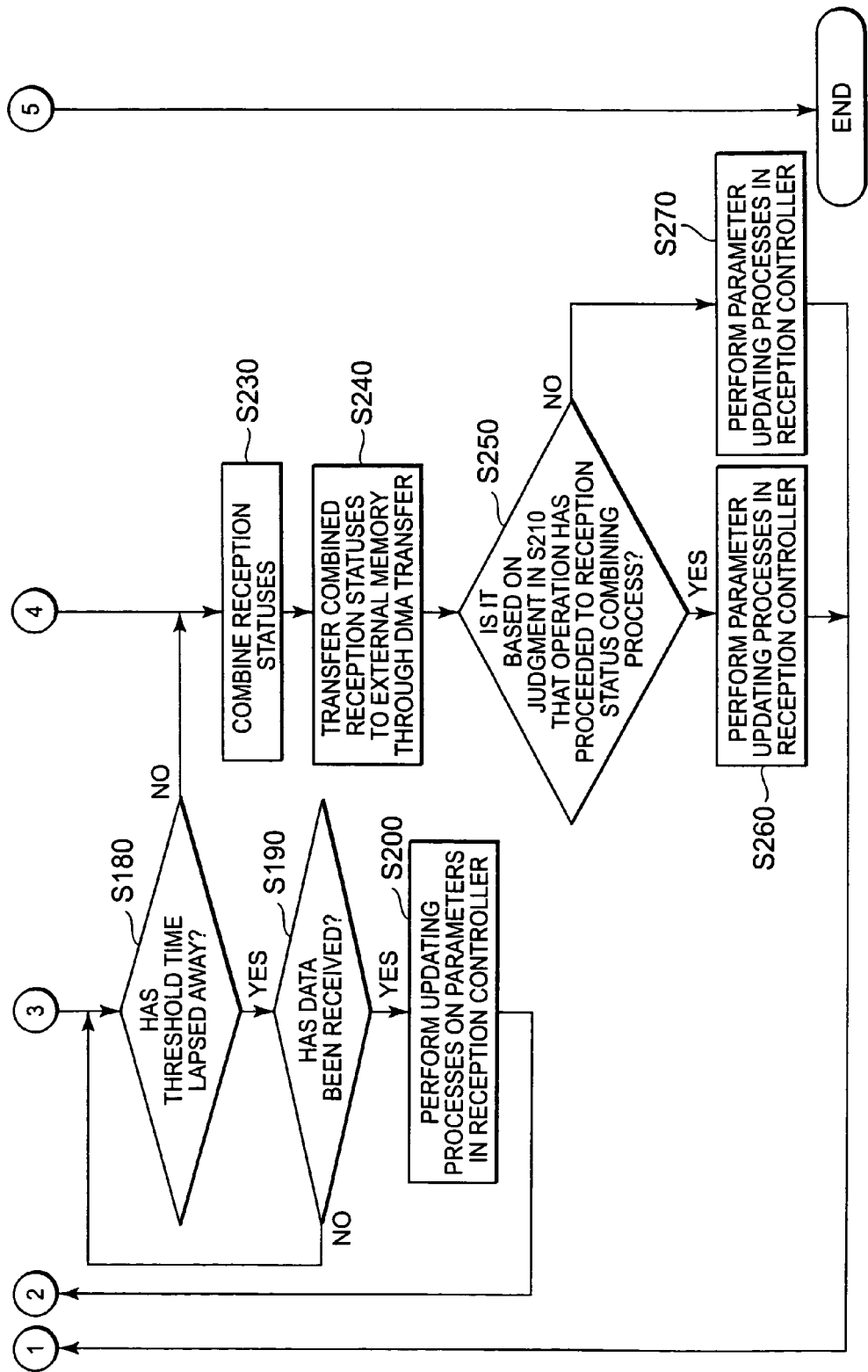

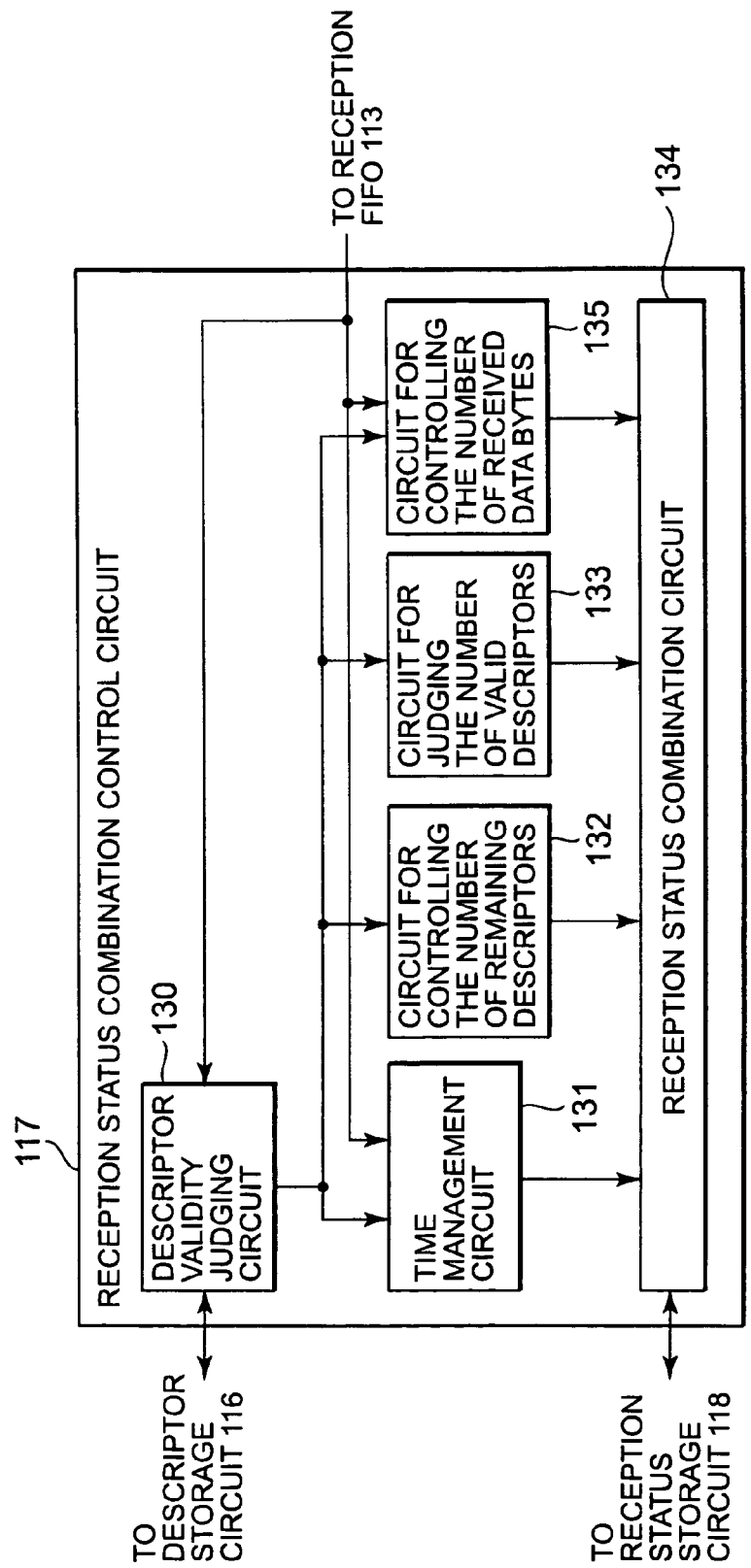

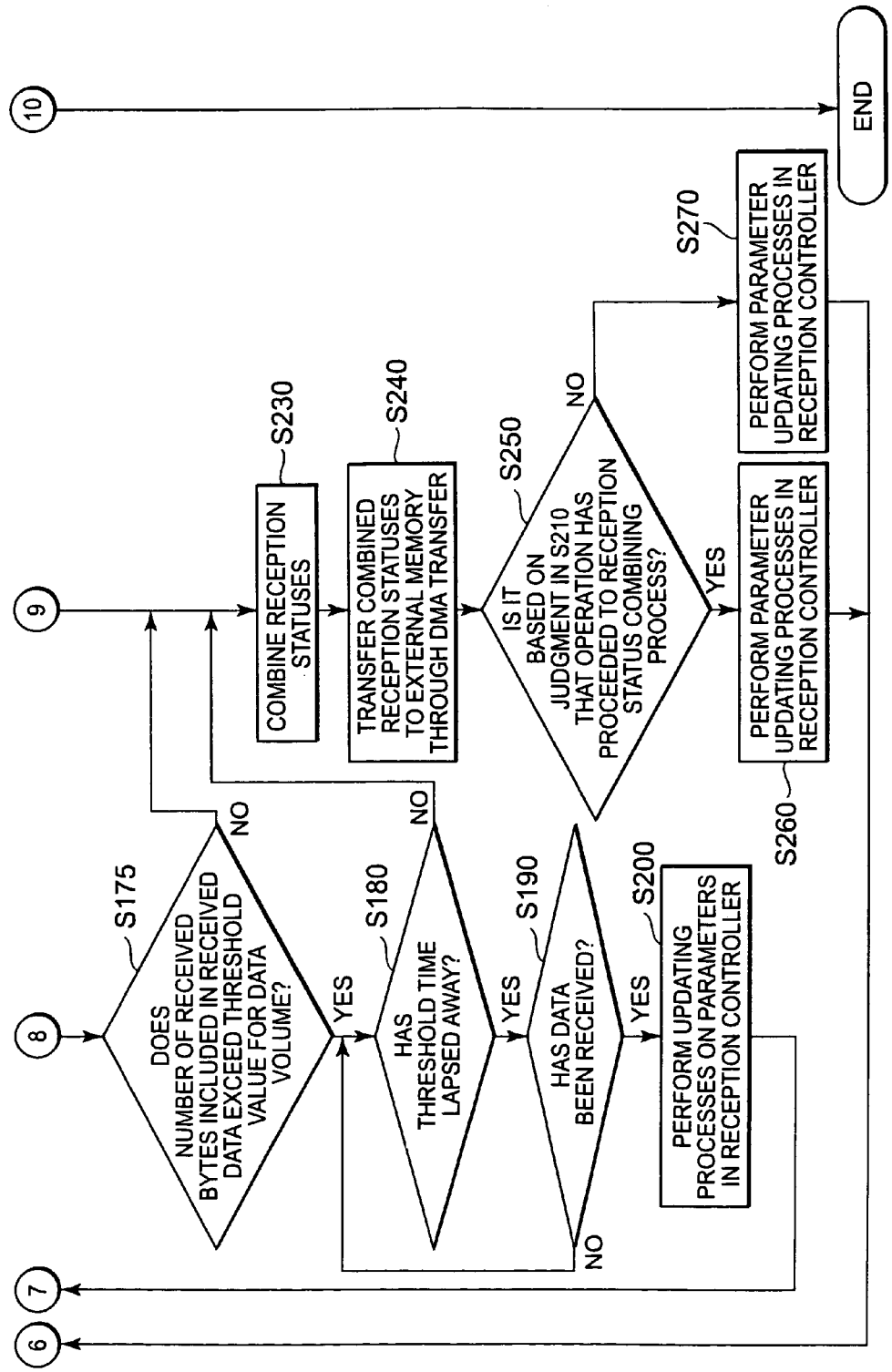

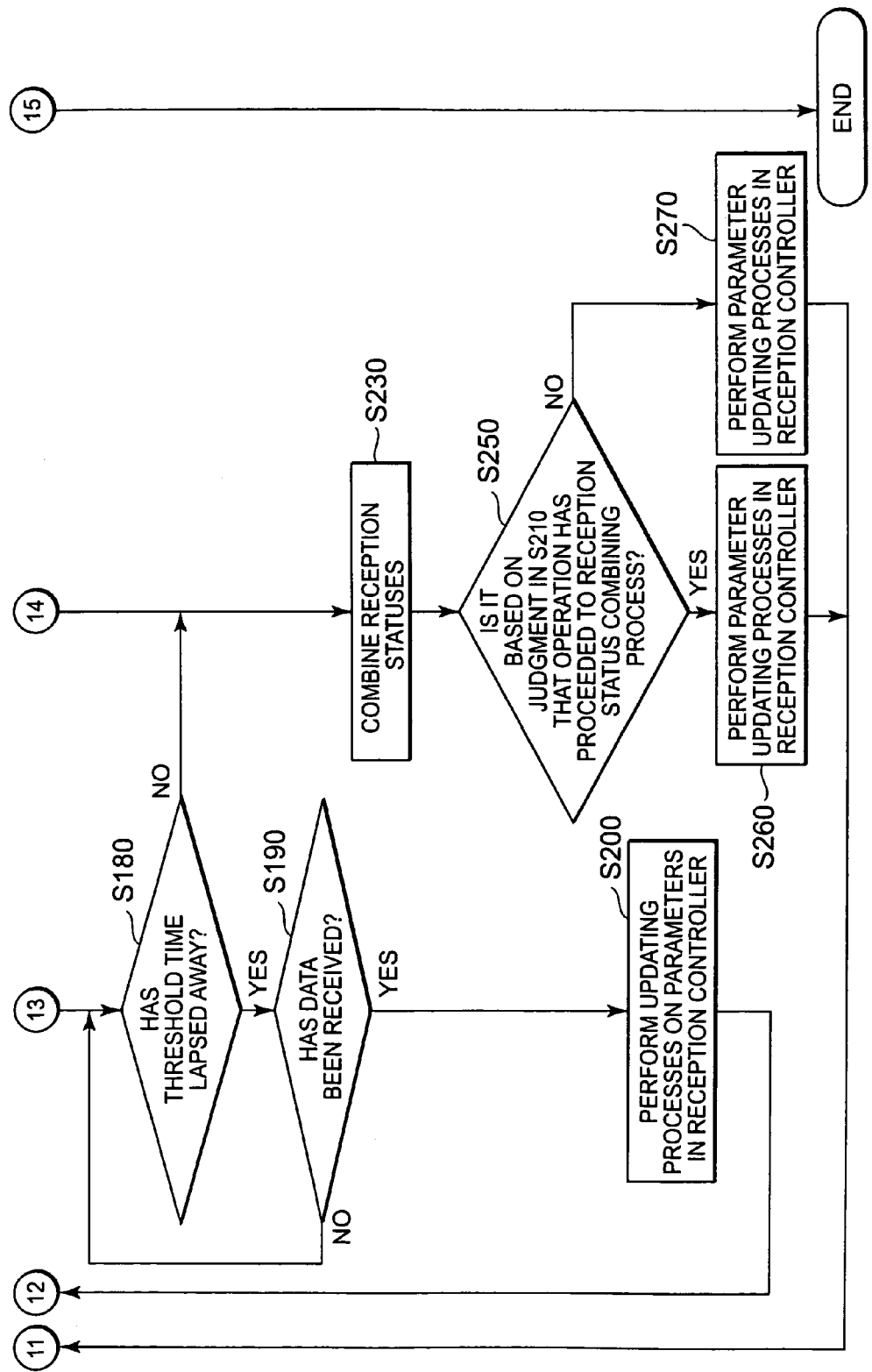

NETWORK PROCESSOR, RECEPTION CONTROLLER AND DATA RECEPTION PROCESSING METHOD PERFORMING DIRECT MEMORY ACCESS TRANSFER

INCORPORATION BY REFERENCE

This application is based upon and claims the benefit of priority from Japanese Patent Application No. 2009-054214 which was filed on Mar. 6, 2009, the disclosure of which is incorporated herein in its entirety by reference.

BACKGROUND OF THE INVENTION

1. Field of the Invention

The present invention relates to a network processor, and particularly to a network processor for performing a DMA (Direct Memory Access) transfer.

2. Description of Related Art

The DMA transfer is a technique for transferring data directly to a memory without being accompanied by any arithmetic operation of a CPU (Central Processing Unit). Load on the CPU is required to be reduced in order to cope with higher-speed operation of a computer system. In addition, a memory access time is also required to be reduced. The DMA transfer plays an increasingly important role as a technique for solving these problems. Techniques related to such a DMA transfer have been disclosed as follows.

Patent Document 1 (Japanese Patent Application Laid Open No. Hei 6-096007) has disclosed a DMA transfer method which, after a DMA transfer based on current transfer control information is completed, is capable of reducing a time needed to load subsequent transfer control information.

FIG. 1 is a drawing showing a block diagram for implementing a DMA transfer method according to Patent Document 1 (Japanese Patent Application Laid Open No. Hei 6-096007).

As shown in FIG. 1, a CPU 11, an input/output unit 12, a RAM 28 as means for storing transmitted data, a RAM 29 as means for storing transfer control information, and a DMA controlling unit 24 as DMA control means are connected together through a data bus 1, an address bus 2 and a control bus 3. The DMA control unit 24 includes: a control register 26 as control storage means; a fetch circuit 27 as pre-fetch means; and a DMA control circuit 25. Multiple successive sets of 4-byte transfer control information (descriptors) which start at a predetermined address are stored in the RAM 29. From FIG. 1, it is learned that sets of 4-byte information which start at an address (0000) are successively stored in the RAM 29. In FIG. 1, reference sign "H" denotes a hexadecimal numeration system.

As described above, multiple sets of transfer control information are beforehand stored in the respective successive addresses in the RAM 29. The DMA control unit 24 loads sets of transfer control information one by one into the control register 26. Once a request for a DMA transfer occurs in the CPU 11 or the input/output unit 12, the DMA control unit 24 performs the DMA transfer on the basis of the set of transfer control information loaded into the control register 26. In addition, the DMA control unit 24 beforehand loads a set of transfer control information subsequent to the current set of transfer control information that is stored in the control register 26, from the RAM 29 to the fetch circuit 27 included in the DMA control unit 24. Once the DMA control unit 24 completes the DMA transfer on the basis of the current set of transfer control information, the DMA control unit 24 loads the subsequent set of transfer control information from the fetch circuit 27 to the control register 26.

In the DMA transfer method according to Patent Document 1, the DMA control unit 24 beforehand loads to the fetch circuit 27 the set of transfer control information subsequent to the current set of transfer control information that is stored in the control register 26. Thereafter, upon completion of the DMA transfer based on the current set of transfer control information, the DMA control unit 24 loads the subsequent set of transfer control information, which has been beforehand loaded into the fetch circuit 27, to the control register 26. Thereby, the DMA transfer method according to Patent Document 1 can reduce the time needed to load the subsequent set of transfer control information.

SUMMARY

In the DMA transfer method according to Patent Document 1, however, the DMA control unit 24 performs a process of writing status information on the data transfer to the RAM 28 for each execution of a DMA transfer based on a set of transfer control information. For this reason, if the data amount of the status information is larger than the data amount transferred through the DMA transfer, the process in which the DMA control unit 24 writes the set of status information to the RAM 28 occupies a memory bus bandwidth, which poses a problem of reducing the efficiency of the other DMA transfers. As a result, data which fails to be processed because of the shortage of the memory bus bandwidth is discarded.

Communication speeds have become increasingly faster particularly in recent years. Let us assume that, for instance, in communications with a speed of 1 Gbps, Ethernet (Registered Trademark) frames are transmitted and received with a frame length of 64 bytes which is a minimum frame length specified by the standard. In this case, for each DMA transfer process on 64-byte received data, the DMA control unit 24 performs a memory access to write the status information to the RAM 28. Accordingly, the memory access performed to write the status information occupies the memory bus bandwidth. This occupation makes it impossible to complete a process of transferring the received Ethernet (Registered Trademark) frame within a unit length of time. As a result, the frame is discarded.

A network processor according to an exemplary aspect of the present invention is a network processor (100) connected to an external memory (101) which includes storage areas (141, 142) for storing received data and stores descriptors specifying locations of the storage areas, respectively. The network processor includes a descriptor storage circuit (116) for storing a plurality of descriptors out of the descriptors, a DMA control circuit (115) configured to transfer the plurality of descriptors from the external memory (101) to the descriptor storage circuit (116) through DMA transfer, transfer the received data to the storage areas (141, 142) in the external memory (101) through DMA transfer on a basis of the plurality of descriptors stored in the descriptor storage circuit (116) upon receipt of the received data, and generate a reception status indicating a condition of the received data each time the received data is transferred to the external memory (101) through DMA transfer, a reception status storage circuit (118) for storing the reception status, and a reception status combination control circuit (117) for combining the reception statuses which are stored in the reception status storage circuit (118). In the network processor, the DMA control circuit (115) transfers the combined reception statuses to the external memory through DMA transfer.

A reception controller (114) includes the DMA control circuit (115), the descriptor storage circuits (116), the reception status combination control circuit (117) and the reception status storage circuit (118) in the network processor according to any one of claims 1 to 6.

A data reception processing method according to an exemplary aspect of the present invention is a data reception processing method for a network processor connected to an external memory which includes storage areas for storing received data, and stores descriptors specifying locations of the storage areas, respectively. The method includes storing a plurality of descriptors out of the descriptors (S110), transferring the plurality of descriptors from the external memory through DMA (Direct Memory Access) transfers (S110), receiving the received data (S130), transferring the received data to the storage areas in the external memory through DMA transfer by use of the plurality of descriptors (S150), each time the received data is transferred to the external memory through DMA transfer, generating a reception status indicating a condition of the received data (S160), storing the reception status (S160), combining the reception statuses which are stored in the reception status storage circuit (S220), and transferring the combined reception statuses to the external memory through DMA transfer (S230).

The exemplary aspects of the present invention can provide a network processor which is capable of inhibiting a DMA transfer of a reception status from occupying the memory bus bandwidth, and which is accordingly capable of enhancing a data transfer efficiency with which received data are transferred through DMA transfer. For this reason, even in a case where data is transmitted and received in frames each with a shorter length in fast-speed communications, it is possible to prevent the received data from being discarded.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 5B is another flow of the operation made by the network processor 100 according to the first exemplary embodiment;

FIG. 6 is a block diagram showing a configuration of a reception status combination control circuit 117 according to a second exemplary embodiment;

FIG. 8B is another flow of the operation made by the network processor 100 according to the second exemplary embodiment;

FIG. 10B is another flow of the operation made by the network processor 100 according to the third exemplary embodiment.

DETAILED DESCRIPTION OF THE EXEMPLARY EMBODIMENTS (First Exemplary Embodiment)

Figure 1:
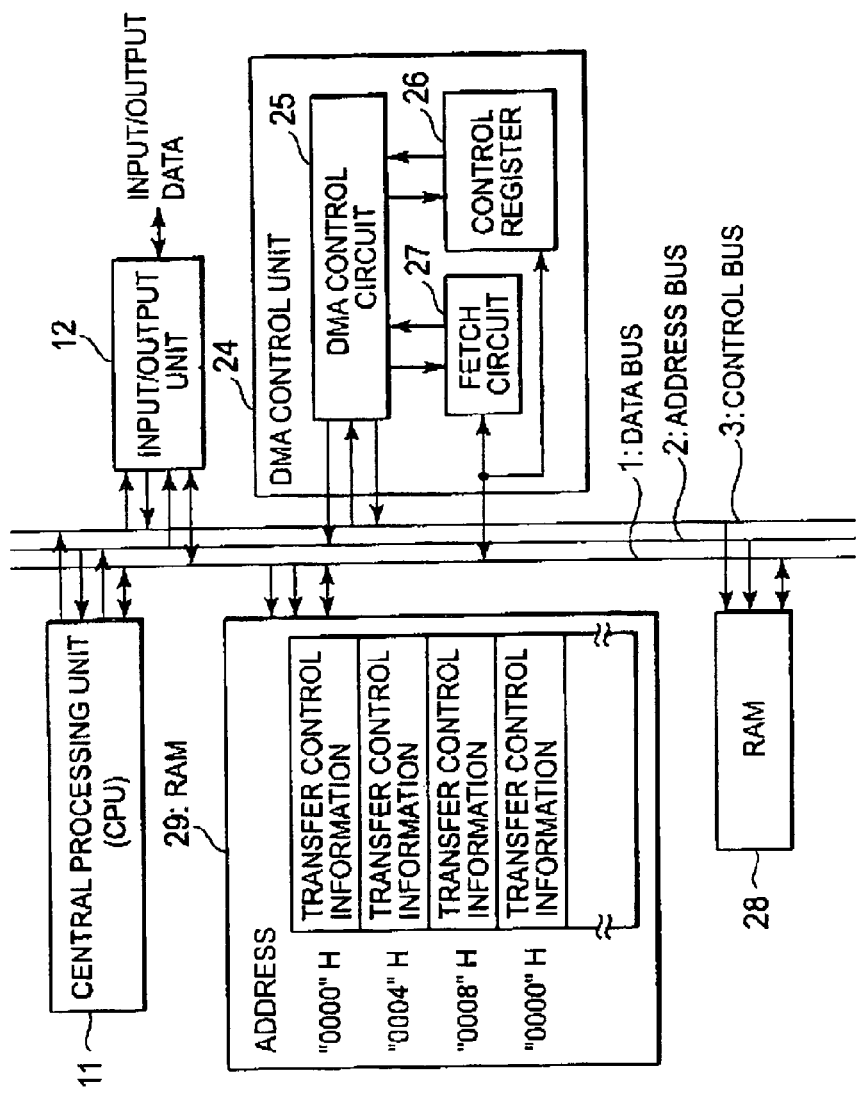
FIG. 1 is a drawing showing a block diagram for realizing a DMA transfer method according to Patent Document 1.
Figure 2:
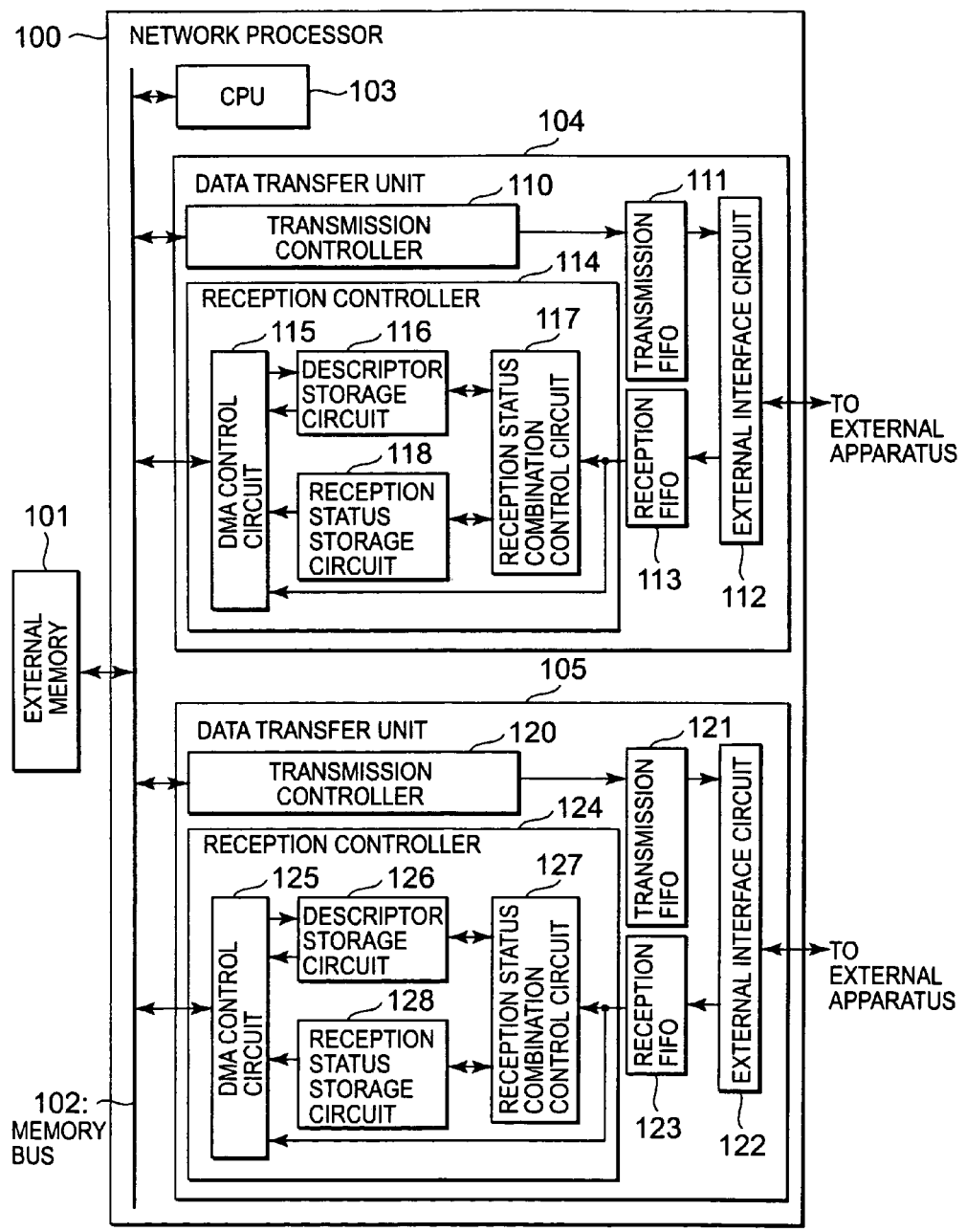
FIG. 2 is a block diagram showing a configuration of a network processor 100 according to a first exemplary embodiment.

FIG. 2 is a block diagram showing the configuration of the network processor 100 according to a first exemplary embodiment.

The network processor 100 includes a CPU (Central Processing Unit) 103, a data transfer unit 104, and a data transfer unit 105. The CPU 103, the data transfer unit 104 and the data transfer unit 105 are connected to a bus memory 102. In addition, an external memory 101, which is provided in the outside of the network processor 100, is connected to the memory bus 102. The CPU 103, the data transfer unit 104, the data transfer unit 105 and the external memory 101 are electrically connected together through the memory bus 102, and are capable of transmitting and receiving data among them.

The CPU 103 controls the entire network processor 100. The data transfer unit 104 and the data transfer unit 105 transmit data to, and receive data from, external apparatuses, which are not illustrated. Note that, because the data transfer unit 105 is identical to the data transfer unit 104, descriptions for the data transfer unit 105 will be omitted. In addition, in the present exemplary embodiment, only the two data transfer units 104, 105 are data transfer units included in the network processor 100. Nevertheless, the network processor 100 may include more than two data transfer units each with the same configuration.

The data transfer unit 104 includes a transmission controller 110, a transmission FIFO (First IN First OUT) 111, an external interface circuit (hereinafter referred to as an "external IF circuit") 112, a reception FIFO 113, and a reception controller 114. The data transfer unit 105 includes a transmission controller 120, a transmission FIFO 121, an external IF circuit 122, a transmission FIFO 123 and a transmission controller 124, although descriptions for the data transfer unit 105 are omitted because, as described above, the configuration of the data transfer unit 105 is the same as that of the data transfer unit 104.

The transmission controller 110 controls a data transmission. The transmission controller 110 is connected to the memory bus 102 and the transmission FIFO 111. The transmission controller 110 is capable of transmitting data to, and receiving data from, the CPU 103 and the external memory 101 through the memory bus 102. The transmission controller 110 outputs outgoing data, which is received from the external memory 101, to the transmission FIFO 111. The transmission FIFO 111 is a buffer for the outgoing data. The transmission FIFO 111 is further connected to the external IF circuit 112. The transmission FIFO 111 buffers the outgoing data which is received from the transmission controller 110, and thereafter outputs the outgoing data to the external IF circuit 112. The external IF circuit 112 is a data transmission/reception interface with the external apparatus. The external IF circuit 112 outputs the outgoing data, which is received from the transmission FIFO 111, to the external apparatus. The external FIFO 112 is further connected to the reception FIFO 113. The external FIFO 112 outputs received data, which is received from the external apparatus, to the reception FIFO 113. The reception FIFO 113 is a buffer for the received data. The reception FIFO 113 is further connected to the reception controller 114. The reception FIFO buffers the received data, which is received from the external IF circuit 112, and outputs the received data to the reception controller 114. The reception controller 114 controls the data reception. Detailed descriptions will be provided for the reception controller 114 later. The reception controller 114 is further connected to the memory bus 102. The reception controller 114 is capable of transmitting data to, and receiving data from, the CPU 103 and the external memory 101 through the memory bus 102. The reception controller 114 outputs the received data, which is received from the reception FIFO 113, to the external memory 101 or the CPU 103 through the memory bus 102.

Detailed descriptions will be hereinbelow provided for the reception controller 114. The reception controller 114 includes a DMA (Direct Memory Access) control circuit 115, a descriptor storage circuit 116, a reception status combination control circuit 117 and a reception status storage circuit 118. The reception controller 124 includes a DMA control circuit 125, a descriptor storage circuit 126, a reception status combination control circuit 127 and a reception status storage circuit 128, although descriptions for the reception controller 124 are omitted because, as described above, the configuration of the reception controller 124 is identical to that of the reception controller 114.

The DMA control circuit 115 is connected to the memory bus 102 and the reception FIFO. The DMA control circuit 115 receives the received data which is received from the reception FIFO. The DMA control circuit 115 performs DMA transfers between the DMA control circuit 115 and the external memory 101 through the memory bus 102. Thus, the DMA control circuit 115 transmits and receives the received data, a descriptor and a reception status to and from the external memory 101. The DMA control circuit 115 is further connected to the descriptor storage circuit 116. The descriptor storage circuit 116 stores descriptors which the DMA control circuit 115 acquires from the external memory 101. The descriptor storage unit 116 is further connected to the reception status combination control circuit 117. The reception status combination control circuit 117 performs a process and a judgment on the basis of a reception status. Detailed descriptions will be provided for the reception status combination control circuit 117 later. The reception status combination control circuit 117 is further connected to the reception FIFO 123 and the reception status storage circuit 128. The reception FIFO 123 is as described above. The reception status combination control circuit 117 receives the received data from the reception FIFO 123, and performs a process and a judgment on a reception status. The reception status storage circuit 128 stores a reception status which is generated by the DMA control circuit 115. The reception status storage circuit 128 is further connected to the DMA control circuit 125. The DMA control circuit 125 stores the reception status in the reception status storage circuit 128, and acquires the reception status from the reception status storage circuit 128. In this respect, the reception status is that which represents information on the set of received data. The reception status includes information on an error in the received frame, and information on the length of the received frame.

Figure 3:
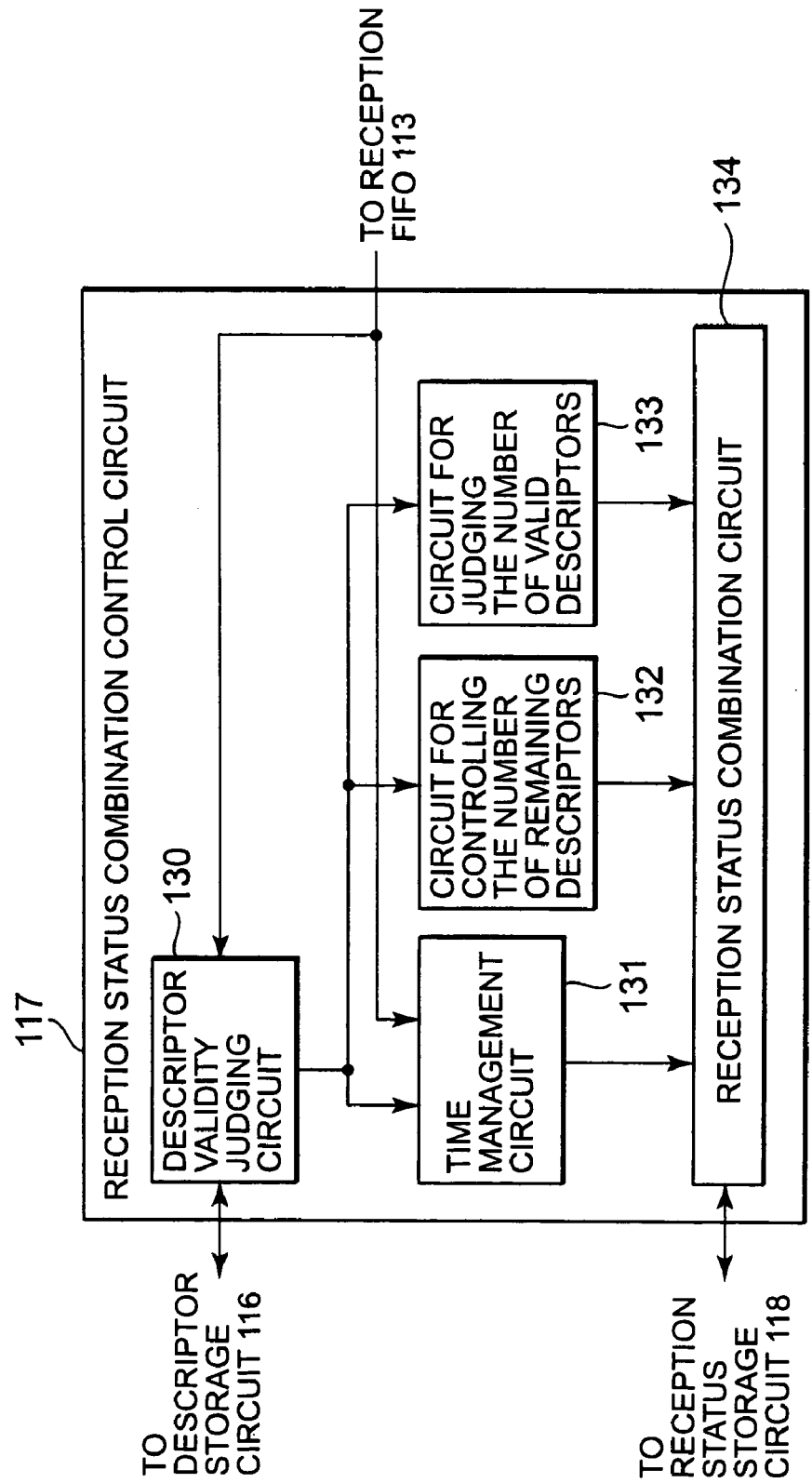
FIG. 3 is a diagram showing a configuration of a reception status combination control circuit 117 according to the first exemplary embodiment.

FIG. 3 is a diagram showing a configuration of the reception status combination control circuit 117 according to the exemplary embodiment. The reception status combination control circuit 117 includes a descriptor validity judging circuit 130, a time management circuit 131, a circuit 132 for controlling the number of remaining descriptors, a circuit 133 for judging the number of valid descriptors, and a reception status combination circuit 134. The reception status combination control circuit 127 has a configuration identical to that of the reception status combination control circuit 117, although descriptions for the reception status combination control circuit 127 is omitted.

The descriptor validity judging circuit 130 is connected to the descriptor storage circuit 116. The descriptor validity judging circuit 130 receives a descriptor from the descriptor storage circuit 116, and judges whether the descriptor is valid or invalid. The descriptor validity judging circuit 130 is further connected to the time management circuit 131, the circuit 132 for controlling the number of remaining descriptors, and the circuit 133 for judging the number of valid descriptors. The time management circuit 131 measures a predetermined length of time after the data is received, and thus judges whether a data communication should be suspended or disconnected. The circuit 132 for controlling the number of remaining descriptors performs a remaining number judgment for judging whether or not all the descriptors, which are stored in the descriptor storage circuit 116, have been used for DMA transfers. The circuit 133 for judging the number of valid descriptors counts the number of valid descriptors. The time management circuit 131, the circuit 132 for controlling the number of remaining descriptors and the circuit 133 for judging the number of valid descriptors are further connected to the reception status combination circuit 134. The reception status combination circuit 134 combines reception statuses representing sets of received data which have been processed by the DMA control circuit 115. The reception status combination circuit 134 is further connected to the reception status storage circuit 118. The descriptor validity judging circuit 130 and the time management circuit 131 perform their respective operations by detecting that the reception controller 114 receives the received data through a method of receiving the received data from the reception FIFO 113 or a method of monitoring the data reception condition of the reception FIFO 113.

Figure 4:
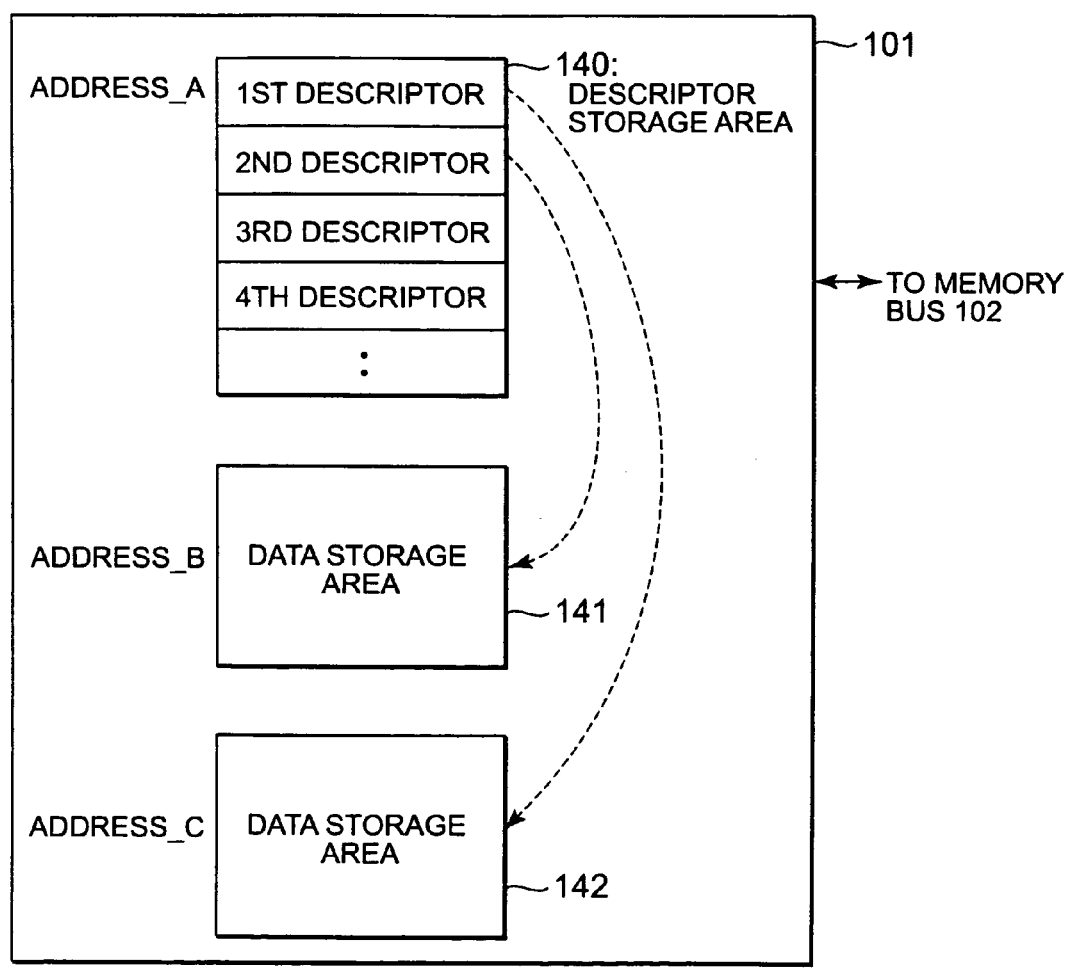
FIG. 4 is a diagram showing a configuration of an external memory 101 according to the first exemplary embodiment.

FIG. 4 is a diagram showing a configuration of the external memory 101 according to the exemplary embodiment. The external memory 101 includes a descriptor storage area 140, a data storage area 141 and a data storage area 142. In the descriptor storage area 140, descriptors are respectively placed in successive addresses. Each descriptor includes: bits indicating whether the descriptor is valid or invalid; address bits indicating an address space in which the received data is written; bits indicating the status of the received data. The data storage areas 141, 142 are areas for storing the received data. In the exemplary embodiment, the data storage area 141 is indicated by Address_B, and the data storage area 142 is indicated by Address_C. Note that: data storage areas, which are included in the external memory 101, are not limited to the data storage areas 141, 142 which are shown in FIG. 4; and in addition to the data storage areas 141, 142, more data storage areas exist in the external memory 101. In association with this, the descriptor storage area 140 is described so as to specify each of these data storage areas.

For instance, as shown in FIG. 4, a first descriptor in the descriptor storage area 140 is recorded in order to store received data in the data storage area 142 which is indicated by Address_C. In addition, a second descriptor in the descriptor storage area 140 is recorded in order to store received data in the data storage area 141 which is indicated by Address_B. Such an external memory 101 is configured on the basis of the prior art. For this reason, more detailed descriptions for the external memory 101 are omitted.

Next, descriptions will be provided for a method of operating the network processor 100 according to the exemplary embodiment.

Figure 5A:
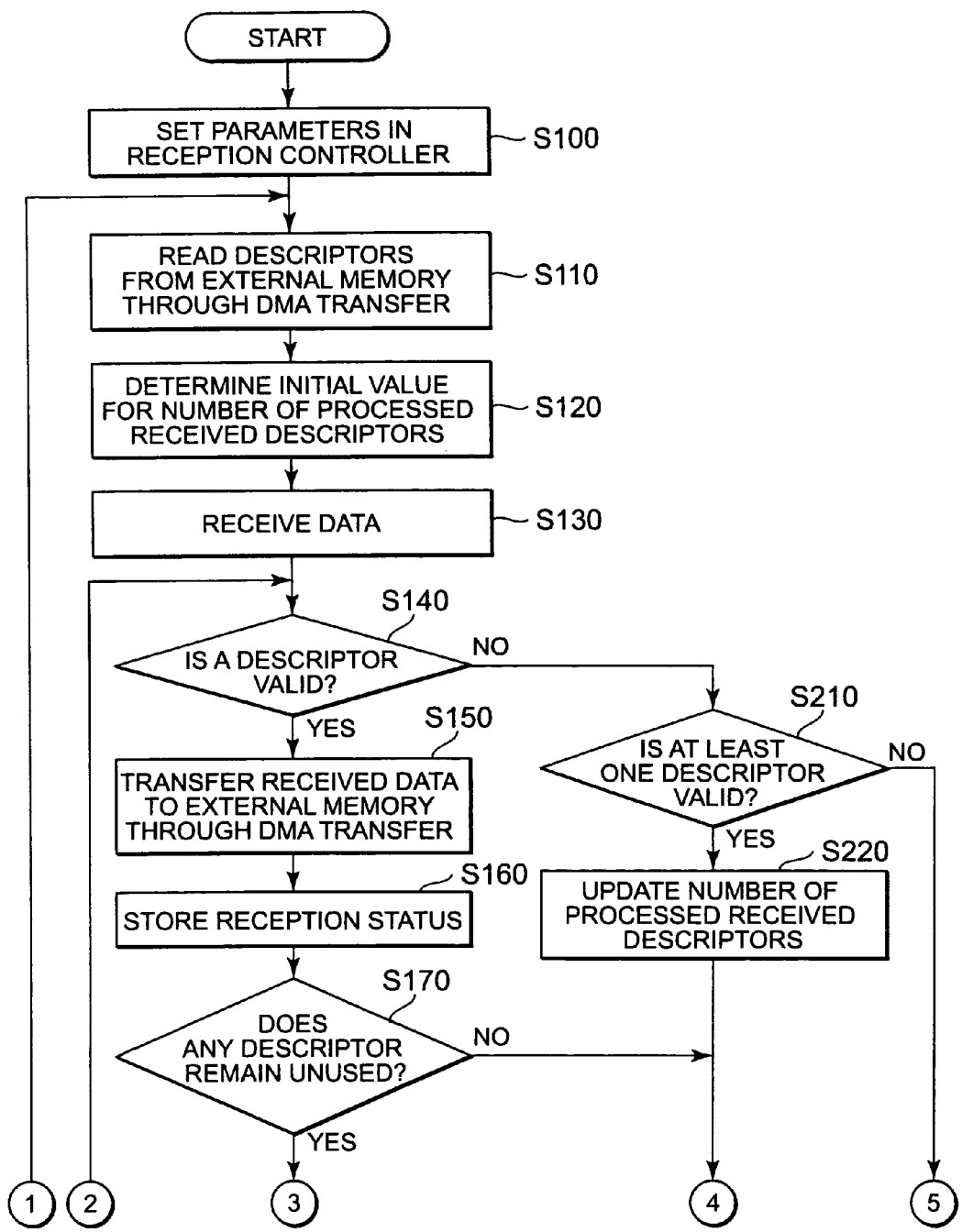
FIG. 5A is a flow of an operation made by the network processor 100 according to the first exemplary embodiment.

FIGS. 5A and 5B are flows of the operation made by the network processor 100 according to the exemplary embodiment.

(Step S100)

First of all, the CPU 103 sets parameters in the reception controller 114. The CPU 103 sets a threshold time "T," which represents a predetermined fixed length of time, in the reception controller 114. The threshold time is a time used for the reception controller 114 to make a time-out judgment on the basis of intervals of receiving the received data. The threshold time is beforehand determined by the designer of the network processer 100. The CPU 103 sets an address "I" in the descriptor storage area 140, which is stored in the external memory 101, in the reception controller 114. On the basis of the address "I," the reception controller 114 sequentially reads descriptors starting with a descriptor which is stored in the address "I." In addition, the CPU 103 sets the number "K" of storable descriptors in the reception controller 114. The number of storable descriptors is the number of descriptors capable of being stored in the descriptor storage circuit 116. Note that in the exemplary embodiment, the number of descriptors capable of being stored in the descriptor storage circuit 116 is set in a way that "K=J." Furthermore, the CPU 103 sets a descriptor pointer of the descriptor storage circuit 116 in the reception controller 114 in a way that "L=1." The descriptor pointer is a pointer for indicating a descriptor to be processed out of the descriptors stored in the descriptor storage circuit 116.

(Step S110)

The DMA control circuit 115 reads descriptors from the external memory 101 by performing a DMA transfer. The DMA control circuit 115 loads the "J" descriptors, which start with the descriptor stored in the address "I" in the descriptor storage area 140 in the external memory 101, to the descriptor pointer "L" of the descriptor storage circuit 116 by performing a DMA transfer. In this respect, reference sign "J" represents the number of storable descriptors.

(Step S120)

The circuit 132 for controlling the number of remaining descriptors sets an initial value of the number "k" of processed received descriptors. The circuit 132 for controlling the number of remaining descriptors is configured to count how many of the descriptors stored in the descriptor storage circuit 116 have been processed. The circuit 132 for controlling the number of remaining descriptors sets the number of processed received descriptors in a way that "k=1."

(Step S130)

The data transfer unit 104 receives data. The external IF circuit 112 receives the data from the external apparatus which is not illustrated. The reception controller 114 receives the received data from the external IF circuit 112 through the reception FIFO 113. Once the received data is inputted into the reception controller 114, the received data is branched and inputted to the DMA control circuit 115 and the reception status combination control circuit 117. Once the reception of the data is detected, the time management circuit 131 is activated, and starts to measure the threshold time "T."

(Step S140)

The descriptor validity judging circuit 130 judges whether or not a descriptor is valid. The descriptor validity judging circuit 130 reads the descriptor, which corresponds to the descriptor point "L," from the descriptor storage circuit 116. The descriptor validity judging circuit 130 judges whether the descriptor corresponding to the descriptor pointer "L" is valid or not (invalid). In this respect, that the descriptor is valid means that a corresponding reception is allowed because the CPU has beforehand written to the descriptor a parameter indicating acceptance of the reception. If the descriptor corresponding to the descriptor pointer "L" is valid, then the operation proceeds to step S150. On the other hand, if the descriptor corresponding to the descriptor pointer "L" is not valid (namely, invalid), then the operation proceeds to step S210.

(Step S150)

The DMA control circuit 115 transfers the received data through DMA transfer. If the descriptor corresponding to the descriptor pointer "L" is valid, then the DMA control circuit 115 transfers the received data to the external memory 101 through DMA transfer on the basis of the descriptor corresponding to the descriptor pointer "L." Hereinafter, a process in which the DMA control circuit 115 transfers received data to the external memory 101 through DMA transfer by use of a valid descriptor will be referred to as a "reception process" from time to time.

(Step S160)

The DMA control circuit 115 stores a reception status. Once the DMA control circuit 115 completes the DMA transfer, the DMA control circuit 115 generates a reception status of the received data. The DMA control circuit 115 stores the reception status in the reception status storage circuit 118.

(Step S170)

The circuit 132 for controlling the number of remaining descriptors makes a judgment on the number of remaining descriptors. In this respect, the judgment on the number of remaining descriptors means a judgment on whether or not all the "J" descriptors stored in the descriptor storage circuit 116 have been used through DMA transfer. The circuit 132 for controlling the number of remaining descriptors accomplishes this judgment by judging whether or not the number "K(=J)" of storable descriptors is equal to the number "k" of processed received descriptors. Note that the judgment on the number of remaining descriptors is made each time the DMA control circuit 115 performs a DMA transfer by use of one of the descriptors stored in the descriptor storage circuit 116. If the number "J" of storable descriptors is equal to the number "k" of processed received descriptors, namely if "J=k," then the operation proceeds to step S230. On the other hand, if the number "K(=J)" of storable descriptors is unequal to the number "k" of processed received descriptors, namely if "K≠," then the operation proceeds to step S180.

(Step S180)

The time management circuit 131 judges whether or not the threshold time "T" has lapsed away. The time management circuit 131 judges whether or not the length of time having been measured since the reception of the data reaches the threshold time "T," if the number "K(=J)" of storable descriptors is unequal to the number "k" of processed received descriptors, namely if "J≠k." The time management circuit 131 judges whether the current communication has been interrupted or completed by judging whether or not the threshold time "T" has lapsed away since the previous reception of data. If the threshold time "T" has not lapsed away yet since the previous reception of data, then the operation proceeds to step S190. On the other hand, if the threshold time "T" has lapsed away, then the operation proceeds to step S230.

(Step S190)

The time management circuit 131 judges whether or not data has been received. The time management circuit 131 judges whether or not the data transfer unit 104 has received data, if the threshold time "T" has not lapsed away yet since the previous reception of data. The time management circuit 131 judges whether or not data has been received on the basis of the presence or absence of data which has been inputted into the reception controller 114 through the reception FIFO from the external IF circuit 112. If no data has been received, then the operation returns to step S180. In this case, through step S180 and step S190, a judgment is repeatedly made on whether or not the data has been received before the lapse of the threshold time "T." On the other hand, if the data has been received, then the operation proceeds to step S200.

(Step S200)

The reception controller 114 updates the parameters. If the data has been received, then the reception controller 114 updates the parameters in order to perform a reception process on the data. The reception controller 114 updates the descriptor pointer of the descriptor storage circuit 116 in a way that "L=L+1." In addition, the circuit 132 for controlling the number of remaining descriptors updates the number of processed received descriptors in a way that "k=k+1." Once the reception controller 114 completes updating the parameters, the operation returns to step S140 in order to process the data.

(Step S210)

The circuit 133 for judging the number of valid descriptors judges whether or not the reception process has been performed on the basis of at least one descriptor. If the descriptor corresponding to the descriptor pointer "L" is not valid (invalid), then the circuit 133 for judging the number of valid descriptors judges whether or not the reception process has been so far performed on the basis of at least one descriptor. For instance, the circuit 133 for judging the number of valid descriptors may count the number of reception processes when the DMA control circuit 115 transfers the received data through the DMA transfer in step S150. On the basis of the count, the circuit 133 for judging the number of valid descriptors may judge whether or not the reception process has been so far performed on the basis of at least one descriptor. Note that as long as the circuit 133 for judging the number of valid descriptors is capable of judging whether or not the reception process has been performed on the basis of at least one descriptor, it does not matter how the circuit 133 for judging the number of valid descriptors accomplishes the judgment. The way of accomplishing the judgment is not limited to the above-described method of counting the number of reception processes. In other words, even if the circuit 133 for judging the number of valid descriptors only stores whether or not the reception process has been performed on the basis of at least one descriptor, the storage serves the purpose. If the reception process has been performed on the basis of at least one descriptor, then the operation proceeds to step S220. If it is not that the reception process has been performed on the basis of at least one description, namely if no reception process using any valid descriptor has been performed, then this operation flow ends.

(Step S220)

The circuit 132 for controlling the number of remaining descriptors updates the number of processed received descriptors. If the reception process has been performed on the basis of at least one descriptor, then the circuit 132 for controlling the number of remaining descriptors updates the number of processed received descriptors in a way that "k=k−1." The reason for this is as follows. In step S200, the number of processed received descriptors has already been updated in a way that "k=k+1." However, no reception process using any descriptor has been performed since the number is counted up. In this context, the number of actually-performed processes and the number of processed received descriptors are made equal to each other.

(Step S230)

The reception status combination circuit 134 combines reception statuses. The reception status combination circuit 134 combines "k" reception statuses in order of the sequence in which the processes have been performed. In this respect, "k" represents the number of performed reception processes. The reception status combination circuit 134 outputs the combined reception statuses to the reception status storage circuit 118. The reception status storage circuit 118 stores the combined reception statuses.

(Step S240)

The DMA control circuit 115 transfers the reception statuses to the external memory 101 through DMA transfer. The DMA control circuit 115 obtains the combined reception statuses from the reception status storage circuit 118, and thus transfers the combined reception statuses from the reception status storage circuit 118 to the address "I" in the descriptor storage area 140 in the external memory 101 through DMA transfer. The external memory 101 stores the combined reception statuses in the address "I" in the descriptor storage area 140.

(Step S250)

The reception status combination circuit 134 judges whether or not it is on the basis of the judgment made by the circuit 133 for judging the number of valid descriptors that the reception status combination circuit 134 has performed the reception status combining process (whether or not it is on the basis of the judgment made in step S210 that the operation has proceeded to step S230). If it is on the basis of the judgment made by the circuit 133 for judging the number of valid descriptors (in step S210) that the reception status combination circuit 134 has the reception status combining process, then the operation proceeds to step S260. On the other hand, if it is not on the basis of the judgment made by the circuit 133 for judging the number of valid descriptors (in step S210) that the reception status combination circuit 134 has the reception status combining process (if the operation has proceeded to step S230 via step S170 and step S180), then the operation proceeds to step S270.

(Step S260)

The reception controller 114 updates its parameters. If it is on the basis of the judgment made by the circuit 113 for judging the number of valid descriptions (in step S210) that the reception status combining process has been performed, then the reception controller 114 updates its parameters. First of all, the reception controller 114 updates the address "I" in which a descriptor is fetched from the external memory 101. The reception controller 114 updates the address "I" in a way that "I=k×M." In this respect, "k" denotes the number of processed received descriptors as described above, and "M" denotes the descriptor size per descriptor (in bytes). In addition, the reception controller 114 updates the descriptor pointer "L" in the descriptor storage circuit 116 in a way that "L=1." That is because the descriptor corresponding to the current descriptor pointer "L" is an invalid descriptor. Furthermore, the descriptor controller 114 initializes the number "k" of processed received descriptors in the circuit 132 for controlling the number of remaining descriptors in a way that "k=1." Thereafter, the operation returns to step S110.
(Step S270)
The reception controller 114 updates its parameters. If it is not on the basis of the judgment made by the circuit 133 for judging the number of valid descriptions (in step S210) that the reception status combining process has been performed (if the operation has proceeded to step S230 via step S170 and S180), then the reception controller 114 updates its parameters. The reception controller 114 updates the address "I" in which a descriptor is fetched from the external memory 101. The reception controller 114 updates the address "I" in a way that "I=k×M." In this respect, "k" denotes the number of processed received descriptors as described above, and "M" denotes the descriptor size per descriptor (in bytes). In addition, the reception controller 114 updates the descriptor pointer "L" in the descriptor storage circuit 116 in a way that "L=L+1."

The foregoing descriptions have been provided for the method of operating the network processor according to the exemplary embodiment.

In the network processor according to the exemplary embodiment, as have been described, the DMA control circuit 115 in the reception controller 114 beforehand reads multiple descriptors to the descriptor storage circuit 116 from the external memory 101 through DMA transfer. The DMA control circuit 115 transfers the received data to the external memory 101 through DMA transfer by use of the descriptors stored in the descriptor storage circuit 116, respectively. Each time the DMA control circuit 115 transfers received data to the external memory 101 through DMA transfer, the DMA control circuit 115 stores the corresponding reception status in the reception status storage circuit 118. Thereafter, the reception status combination control circuit 117 combines the reception statuses which are stored in the reception status storage circuit 118. The DMA control circuit 115 transfers the combined reception statuses to the descriptor storage area 140 in the external memory 101 through DMA transfer. Because the reception controller 114 writes a reception status, which is obtained by combining the multiple reception statuses in this manner, to the external memory 101 through a batched process, it is possible to prevent the band in the memory bus 102 from being occupied. This prevention avoids the reduction in the transfer efficiency with which the DMA control circuit 115 transfers the received data through DMA transfer. Even in a case where received data with a short frame length is received in a fast data communication, it is possible to prevent the received data from being discarded due to the shortage of the memory bus band.
(Second Exemplary Embodiment)

The configuration of the network processor 100 according to a second exemplary embodiment is almost identical to the configuration of the network processor 100 according to the first exemplary embodiment. For this reason, descriptions for the identical parts will be omitted, and descriptions will focus on the difference in configuration between the second exemplary embodiment and the first exemplary embodiment. The configuration of the network processor 100 according to the second exemplary embodiment is different from the configuration of the network processor 100 according to the first exemplary embodiment in terms of the configurations of the reception status combination control circuits 117, 127 in the reception controller 114, 124 in the data transfer units 104, 105, respectively. The rest of the configuration of the network processor 100 according to the second exemplary embodiment is identical to the rest of the configuration of the network processor 100 according to the first exemplary embodiment. For this reason, descriptions for the rest of the configuration of the network processor 100 according to the second exemplary embodiment will be omitted.

FIG. 6 is a block diagram showing the configuration of the reception status combination control circuit 117 according to the second exemplary embodiment. Note that the configurations of the respective reception status combination control circuits 117, 127 are identical to each other as in the first exemplary embodiment. For this reason, descriptions will be provided only for the reception status combination control circuit 117, and descriptions for the reception status combination control circuit 127 will be omitted.

The reception status combination control circuit 117 includes the descriptor validity judging circuit 130, the time management circuit 131, the circuit 132 for controlling the number of remaining descriptors, the circuit 133 for judging the number of valid descriptors and the reception status combination circuit 134, as in the first exemplary embodiment. The reception status combination control circuit 117 further includes a circuit 135 for controlling the number of received data bytes. The descriptor validity judging circuit 130, the time management circuit 131, the circuit 132 for controlling the number of remaining descriptors, the circuit 133 for judging the number of valid descriptors and the reception status combination circuit 134 according to the second exemplary embodiment are respectively identical to those according to the first exemplary embodiment. For this reason, descriptions for them will be omitted.

The circuit 135 for controlling the number of received data bytes makes a threshold value judgment on the basis of the number of data bytes included in received data.

Figure 7:
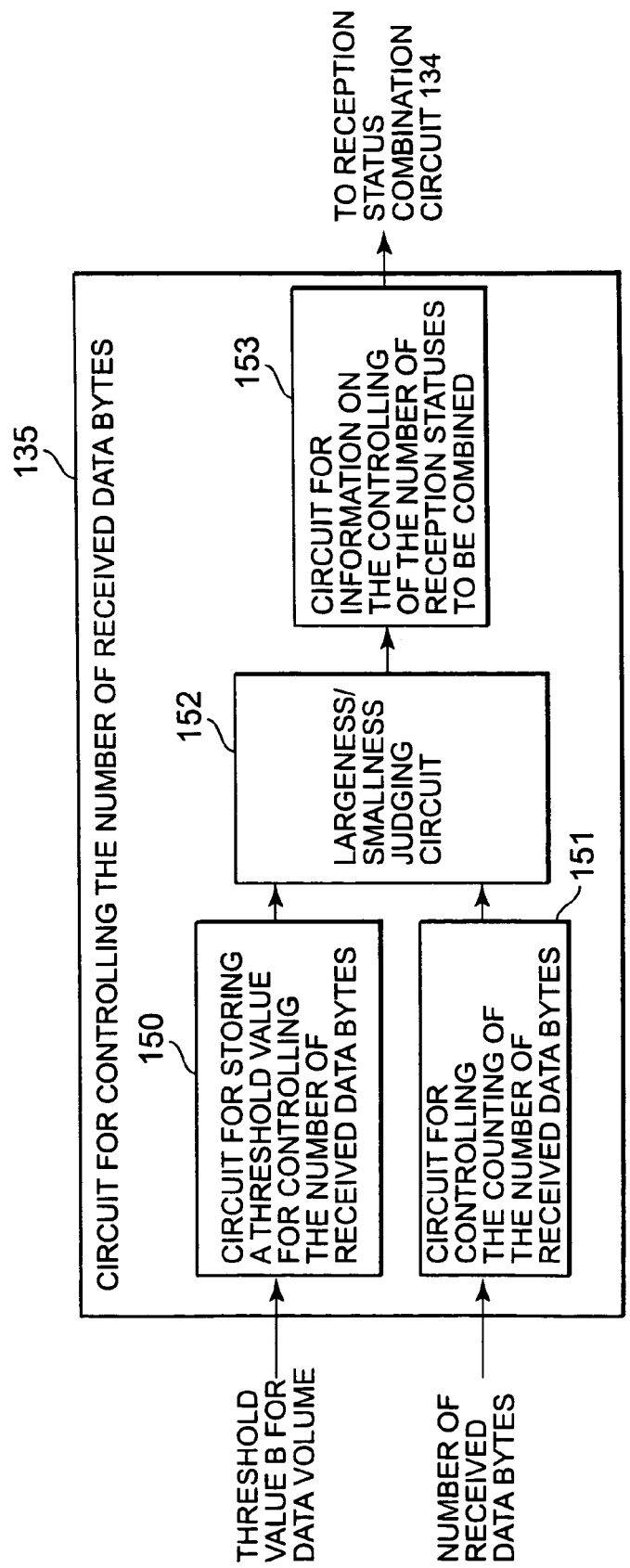
FIG. 7 is a block diagram showing a configuration of a circuit 135 for controlling the number of received data bytes according to the second exemplary embodiment.

FIG. 7 is a block diagram showing a configuration of the circuit 135 for controlling the number of received data bytes according to the second exemplary embodiment. The circuit 135 for controlling the number of received data bytes includes a circuit 150 for storing a threshold value for controlling the number of received data bytes, a circuit 151 for controlling the counting of the number of received data bytes, a largeness/smallness judging circuit 152, and a circuit 153 for information on the controlling of the number of reception statuses to be combined.

The circuit 150 for storing a threshold value for controlling the number of received data bytes beforehand stores a threshold value. "B" for data volume which is used to make a judgment on the number of received bytes included in received data. The threshold value "B" for data volume is beforehand stored in the circuit 150 for storing a threshold value for controlling the number of received data bytes by the CPU 103. The circuit 151 for controlling the counting of the number of received data bytes counts the number of received bytes included in the received data which is received by the reception controller 114. The largeness/smallness judging circuit 152 judges whether or not the number of received bytes included in the received data, which is counted by the circuit 151 for controlling the counting of the number of received data bytes, exceeds the threshold value "B" for data volume which is stored in the circuit 150 for storing a threshold value for controlling the number of received data bytes. Note that the circuit 151 for controlling the counting of the number of received data bytes counts the number of received bytes included in the received data by receiving the received data from the reception FIFO 113, or by monitoring a condition in which the reception FIFO 113 receives the data.

The circuit 153 for information on the controlling of the number of reception statuses to be combined makes a judgment on the number of reception statuses to be combined, if the largeness/smallness judging circuit 152 judges that the number of received bytes included in the received data, which is counted by the circuit 151 for controlling the counting of the number of received data bytes, exceeds the threshold value "B" for data volume which is stored in the circuit 150 for storing a threshold value for controlling the number of received data bytes. The circuit 153 for information on the controlling of the number of reception statuses to be combined informs the reception status combination circuit 134 of the fact that the number of received bytes included in the received data exceeds the threshold value "B" for data value, in addition to the number of reception statuses to be combined. In the second exemplary embodiment, once the reception status combination circuit 134 received the information from the circuit 153 for information on the controlling of the number of reception statuses to be combined, the reception status combination circuit 134 performs a reception status combining process.

Let us assume that the reception controller 114 continuously receives 100-byte received frames in a case where the threshold value "B" for data volume is set at 450 bytes. Once the reception controller 114 receives the fifth received frame, the number of received bytes included in the received data reaches 500 bytes, and thus exceeds the 450 bytes which is the threshold value "B" for data volume. For this reason, the largeness/smallness judging circuit 152 judges that the number of received bytes included in the received data exceeds the threshold value "B" for data volume. In conjunction with this, the circuit 153 for information on the controlling of the number of reception statuses to be combined determines that the number of reception statuses to be combined is "5." The circuit 153 for information on the controlling of the number of reception statuses to be combined informs the reception status combination circuit 134 of the fact that the number of received bytes included in the received data exceeds the threshold value "B" for data volume, in addition to the "5" which is the number of reception statuses to be combined.

The following point should be noted. This description explains that the circuit 153 for information on the controlling of the number of reception statuses to be combined judges that the number of reception statuses to be combined is "5." However, the circuit 153 for information on the controlling of the number of reception statuses to be combined, for instance, may judge that the reception statuses, to which the respective reception processes have been applied, should be combined once the number of received bytes included in the received data is judged as exceeding the threshold value "B" for volume data. In this case, the circuit 153 for information on the controlling of the number of reception statuses to be combined is configured to judge that the number of reception statuses to be combined is "4." This configuration enables the reception status combination circuit 134 to perform its reception status combining process on the basis of the number of received bytes included in the received data.

The foregoing descriptions have been provided for the configuration of the network processor 100 according to the second exemplary embodiment. The configuration exclusive of the above-described part is identical between the second exemplary embodiment and the first exemplary embodiment. For this reason, descriptions for the configuration exclusive of the above-described part will be omitted.

Next, descriptions will be provided for a method of operating the network processor 100 according to the second exemplary embodiment.

Figure 8A:
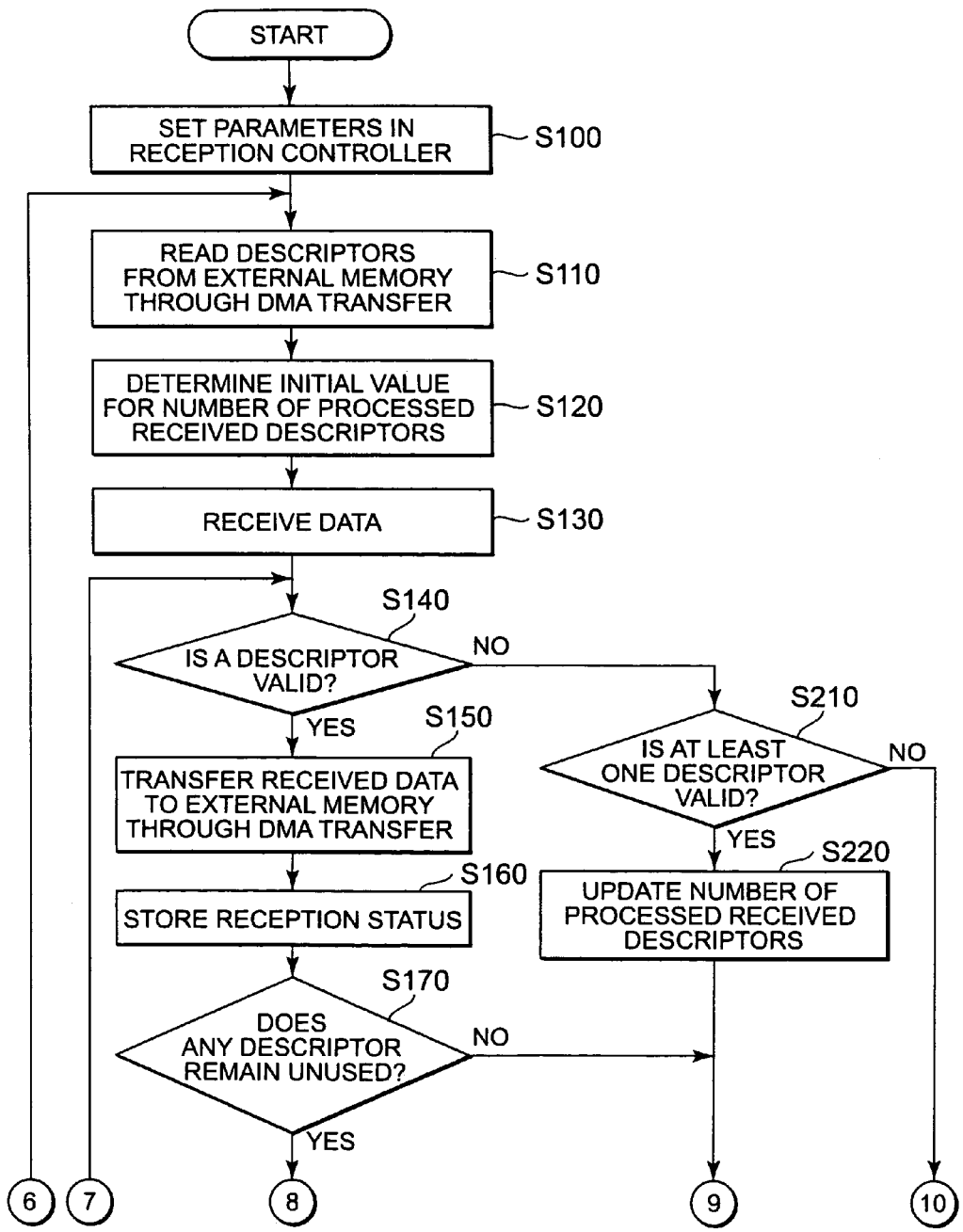
FIG. 8A is a flow of an operation made by a network processor 100 according to the second exemplary embodiment.

FIGS. 8A and 8B are flows of the operation made by the network processor 100 according to the second exemplary embodiment. The method of operating the network processor 100 according to the second exemplary embodiment is almost identical to the method of operating the network processor 100 according to the first exemplary embodiment. For this reason, descriptions for the identical part will be omitted, and descriptions will focus on the difference between the second exemplary embodiment and the first exemplary embodiment. The method of operating the network processor 100 according to the second exemplary embodiment is different from the method of operating the network processor 100 according to the first exemplary embodiment in that a threshold value judgment, by the circuit 135 for controlling the number of received data bytes, on the number of received bytes included in received data over the threshold value "B" for data volume (step S175) is added to the method of operating the network processor 100 according to the present invention.

(Step S100)

First of all, the CPU 103 sets the parameters in the reception controller 114. As in the first exemplary embodiment, the CPU 103 sets in the reception controller 114: the threshold time "T," which represents the predetermined fixed length of time; the address "I" of the descriptor storage area 140; and the number "K" of storable descriptors. In addition, the CPU 103 sets the descriptor pointer "L" of the descriptor storage circuit 116 in the reception controller 114 in a way that "L=1." Furthermore, the CPU 103 according to the second exemplary embodiment sets the threshold value "B" for data volume of the circuit 150 for storing a threshold value for controlling the number of received data bytes.

(Steps S110 to S170)

Steps S110 to S170 are identical to those in the first exemplary embodiment. For this reason, descriptions for steps S110 to S170 will be omitted. To put it specifically, the DMA control circuit 115 reads descriptors from the external memory 101 by performing a DMA transfer (step S110). The circuit 132 controlling the number of remaining descriptors sets an initial value for the number "k" of processed received descriptors (step S120). The data transfer unit 104 receives data (step S130). The descriptor validity judging circuit 130 judges whether or not a descriptor is valid or invalid (step S140). The DMA control circuit 115 transfers the received data through DMA transfer (step S150). The DMA control circuit 115 stores a reception status (step S160). The circuit 132 for controlling the number of remaining descriptors makes a judgment on the number of remaining descriptors (step S170). Note that, if the number "K(=J)" of storable descriptors is unequal to the number "k" of processed received descriptors in step S170, namely if "J≠k, then" the operation proceeds to step S175.

(Step S175)

The circuit 135 for controlling the number of received bytes makes a threshold value judgment using the threshold value "B" for data volume. If the number "K(=J)" of storable descriptors is unequal to the number "k" of processed received descriptors, namely if "J≠k," then the circuit 135 for controlling the number of received bytes makes the threshold value judgment on the number of received bytes included in the received data over the threshold value "B" for data volume. The threshold value judgment using the threshold value "B" for data volume is made by the largeness/smallness judging circuit 152. The largeness/smallness judging circuit 153 judges whether or not the number of received data bytes, which is counted by the circuit 151 for controlling the counting of the number of received data bytes, exceeds the threshold value "B" for data volume which is stored in the circuit 150 for storing a threshold value for controlling the number of received data bytes. If a result of the threshold value judgment is that the number of bytes included in the received data exceeds the threshold value "B" for data volume, then the operation proceeds to step S230. On the other hand, if a result of the threshold value judgment is that the number of bytes included in the received data does not exceed the threshold value "B" for data volume, then the operation proceeds to step S180.

(Step S180)

The time management circuit 131 judges whether or not the threshold time "T" has lapsed away. The time management circuit 131 judges whether or not the length of time having been measured since the reception of the received data has reached the threshold time "T," if the result of the threshold value judgment is that the number of bytes included in the received data does not exceeds the threshold value "B" for data volume. The rest of the operation made in this step is identical to the rest of the operation made in the corresponding step according to the first exemplary embodiment. For this reason, descriptions for the rest of the operation made in this step will be omitted.

(Step S190 to Step S270)

Steps S190 to S270 are identical to those according to the first exemplary embodiment. For this reason, descriptions for steps S190 to S270 will be omitted. To put it briefly, the time management circuit 131 judges whether or not data has been received (step S190). The reception controller 114 updates the parameters (step S200). The circuit 133 for judging the number of valid descriptors whether or not the reception process has been performed on the basis of at least one descriptor (step S210). The circuit 132 for controlling the number of remaining descriptors updates the number of processed received descriptors (step S220). The reception status combination circuit 134 combines the reception statuses (step S230). The DMA control circuit 115 transfers the combined reception statuses to the external memory 101 through DMA transfer (step S240). The reception status combination circuit 134 judges whether or not it is on the basis of the judgment by the circuit 133 for judging the number of valid descriptors that the reception status combination circuit 134 performs the process of combining the reception statuses (step S250). The reception controller 114 updates the parameters (step S260). The reception controller 114 updates the parameters (step S270). Note that, in a case where it is judged that the operation has proceeded to step S230 via step S175 in step S250 according to the second exemplary embodiment, the operation proceeds to step S270.

As have been described above, in the network process according to the second exemplary embodiment, the reception status combination control circuit 117 includes the circuit 135 for controlling the number of received bytes in addition to the configuration according to the first exemplary embodiment. The circuit 135 for controlling the number of received bytes makes the threshold value judgment on the number of received bytes included in the received data over the threshold value "B" for data volume. While the data is received in shorter frames, this configuration combines a larger number of corresponding reception statuses, and thus transfers the combined reception statuses through DMA transfer. This can prevent the DMA transfer from occupying the band of the memory bus 102. On the other hand, while the data is received in longer frames, it is unlikely that the DMA transfer may occupy the band of the memory bus 102. For this reason, the configuration combines a smaller number of corresponding reception statuses, and thus transfers the combined reception statuses through DMA transfer. This makes it possible to reduce the stay time of the reception statuses to a certain length of time.

Third Exemplary Embodiment

Next, descriptions will be provided for a network processor according to a third exemplary embodiment.

First of all, descriptions will be provided for a configuration of the network processor 100 according to the third exemplary embodiment. The configuration of the network processor 100 according to the third exemplary embodiment is almost identical to the configurations of the network processors 100 according to the first and second exemplary embodiments, respectively. For this reason, descriptions for the identical part will be omitted, and descriptions will focus chiefly on the difference in configuration between the third exemplary embodiment and the first to second exemplary embodiments. The configuration of the network processor 100 according to the third exemplary embodiment is different from the configurations of the network processors 100 according to the first and second exemplary embodiments, respectively, in that read/write (hereinafter shortened to "R/W") descriptor storage circuits 200, 201 replace the descriptor storage circuits 116, 126 and the reception status storage circuit 118, 128 in the reception controller 114, 124, respectively. The rest of the configuration of the network processor 100 according to the third exemplary embodiment is identical to the rest of the configuration of the network processor 100 according to each of the first and second exemplary embodiments. For this reason, descriptions for the rest thereof will be omitted.

Figure 9:
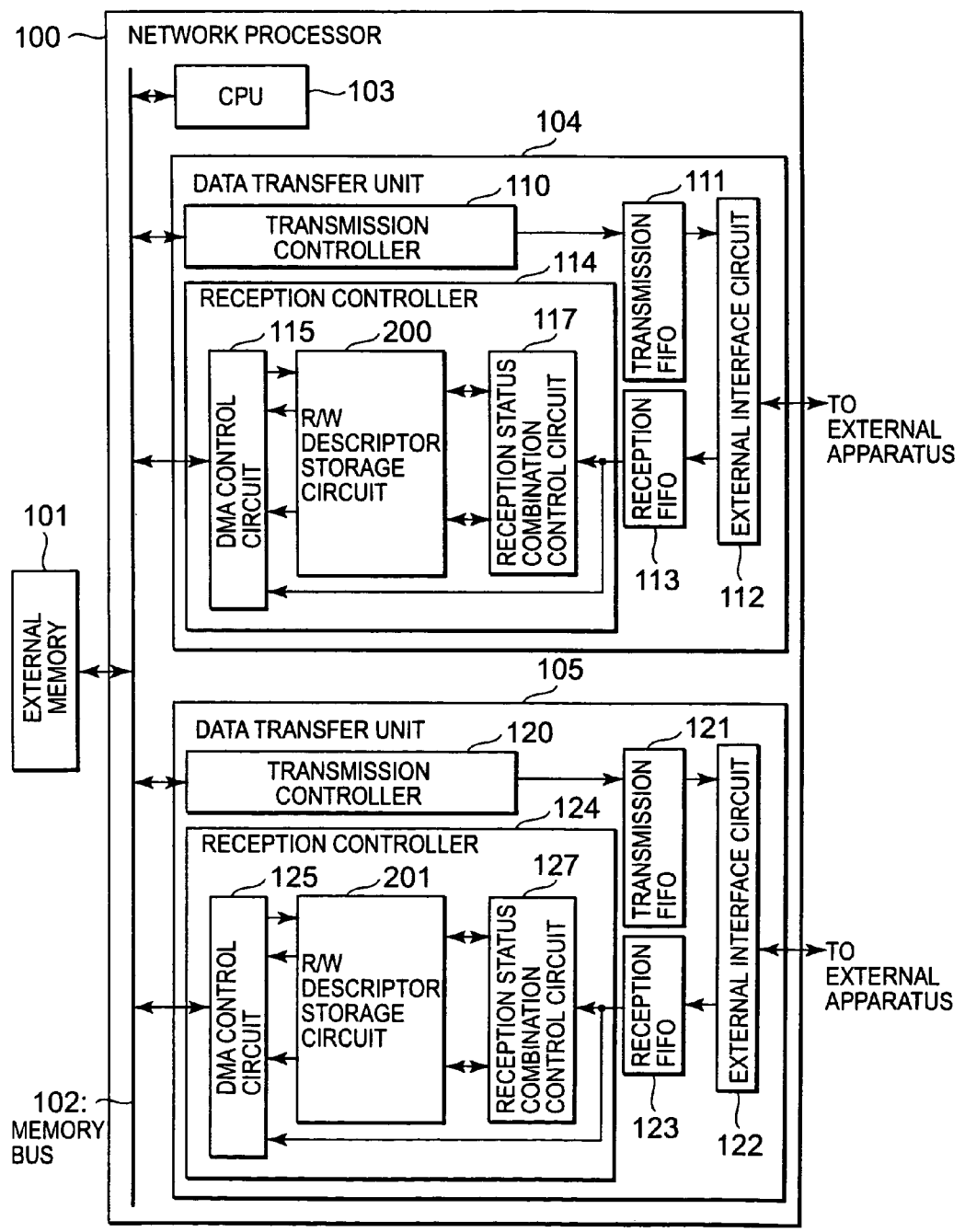
FIG. 9 is a block diagram showing a configuration of a network processor 100 according to a third exemplary embodiment.

FIG. 9 is a block diagram showing the configuration of the network processor 100 according to the third exemplary embodiment. Note that the configurations of the respective data transfer units 104, 105 are identical to each other as in the first and second exemplary embodiments. For this reason, descriptions will be provided for the data transfer unit 104 only, and descriptions for the data transfer unit 105 will be omitted.

The reception controller 114 includes the DMA controller 115 and the reception status combination control circuit 117 as in the first exemplary embodiment. The reception controller 114 further includes the R/W descriptor storage circuit 200. In other words, the descriptor storage circuit 116 and the reception status storage circuit 118 in the reception controller 114 are replaced with the R/W descriptor storage circuit 200. The R/W descriptor storage circuit 200 includes the function of the descriptor storage circuit 116 and the function of the reception status storage circuit 118. This replacement of the descriptor storage circuit 116 and the reception status storage circuit 118 with the R/W descriptor storage circuit makes it possible to construct the reception controller 114 with a simpler configuration.

The foregoing descriptions have been provided for the configuration of the network processor 100 according to the third exemplary embodiment. The configuration exclusive of the above-described part is identical between the third exemplary embodiment and the first to second exemplary embodiments. For this reason, descriptions for the configuration exclusive of the above-described part will be omitted.

Next, descriptions will be provided for a method of operating the network processor 100 according to the third exemplary embodiment.

Figure 10A:
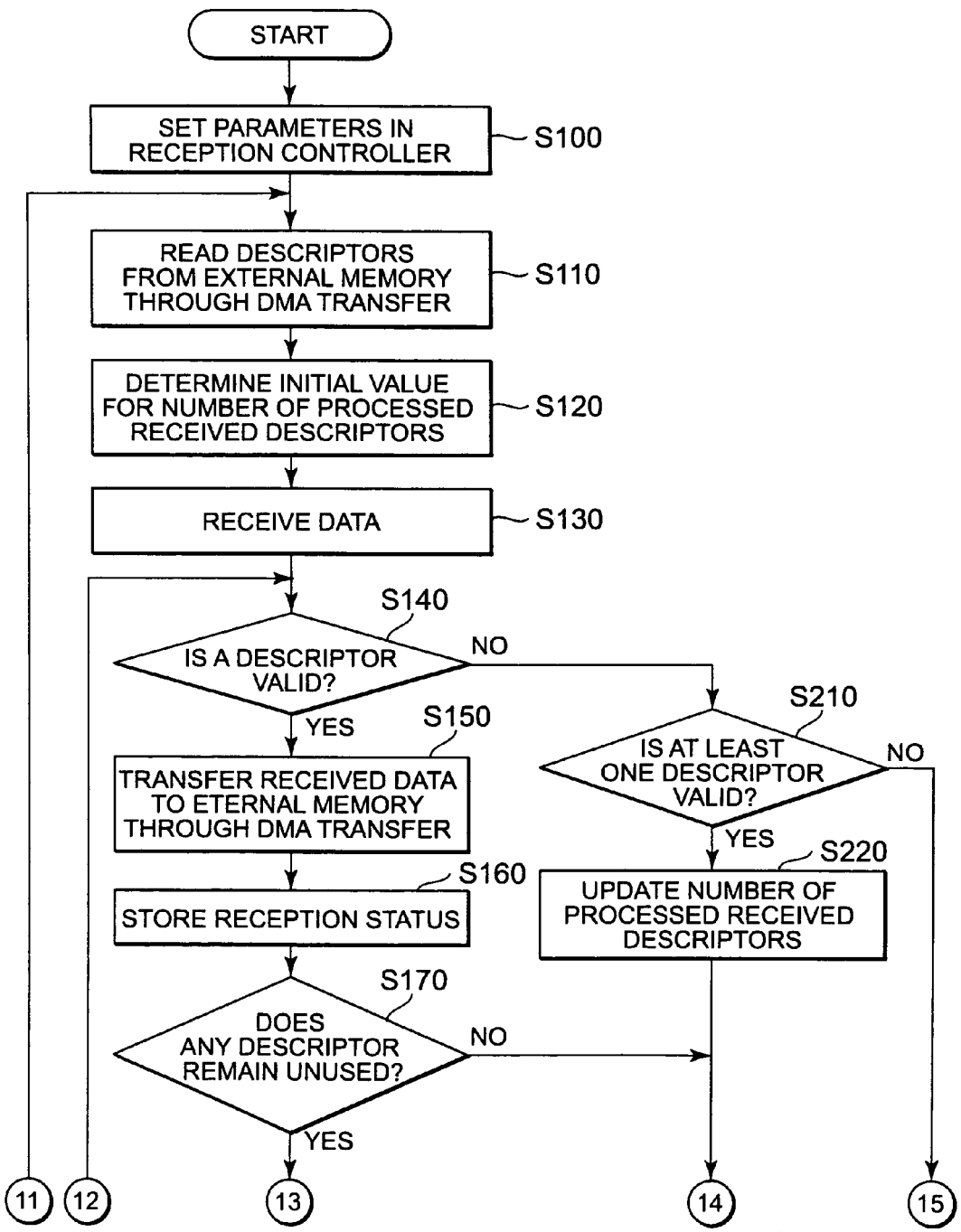
FIG. 10A is a flow of an operation made by the network processor 100 according to the third exemplary embodiment.

FIGS. 10A and 10B are flows of the operation made by the network processor 100 according to the third exemplary embodiment. The method of operating the network processor 100 according to the third exemplary embodiment is almost identical to the method of operating the network processor 100 according to each of the first and second exemplary embodiments. For this reason, descriptions for the identical part will be omitted, and descriptions will focus chiefly on the difference between the third exemplary embodiment and the first to second exemplary embodiments. Note that, although the following descriptions will be provided for the difference between the operational flow according to the third exemplary embodiment and the operational flow (shown in FIGS. 5A and 5B) according to the first exemplary embodiment, the same difference can be also applied to the operational flow (shown in FIGS. 8A and 8B) according to the second exemplary embodiment.

(Step S100)

First of all, the CPU 103 sets the parameters in the reception controller 114.

The CPU 103 sets the number "K" of storable descriptors in the reception controller 114. In the third exemplary embodiment, the number of storable descriptors is the number of descriptors capable of being stored in the R/W descriptor storage circuit 200. Note that, in the third exemplary embodiment, the number of storable descriptors which can be stored in the R/W descriptor storage circuit 200 is set in a way that "K=J." In addition, the CPU 103 sets the descriptor pointer of the R/W descriptor storage circuit 200 in the reception controller 114 in a way that "L=1." The descriptor pointer is a pointer for indicating a descriptor to be processed out of the descriptors stored in the R/W descriptor storage circuit 200. The rest of the operation made in this step is identical to the rest of the operation made in the corresponding step according to the first exemplary embodiment.

(Step S110)

The DMA control circuit 115 reads descriptors from the external memory 101 by performing a DMA transfer. The DMA control circuit 115 loads the "J" descriptors, which start with a descriptor that is stored in the address "I" in the descriptor area 140 in the external memory 101, to the descriptor pointer "L" in the R/W descriptor storage circuit 200 by performing a DMA. In this respect, reference sign "J" denotes the number of storable descriptors.

(Step S120 to Step S130)

Steps S120 to S130 are identical to those according to the first exemplary embodiment. For this reason, descriptions for steps S120 to S130 will be omitted. To put it briefly, the circuit 132 for controlling the number of remaining descriptors sets an initial value for the number "k" of processed received descriptors. The data transfer unit 104 receives data (step S130).

(Step S140)

The descriptor validity judging circuit 130 judges whether or not descriptors are valid. In the third exemplary embodiment, the descriptor validity judging circuit 130 reads the descriptors, which corresponds to the descriptor pointer "L," from the R/W descriptor storage circuit 200. The rest of the operation made in this step is identical between the third exemplary embodiment and the first exemplary embodiment. For this reason, descriptions for the reset thereof will be omitted.

(Step S150)

Step S150 is identical between the third exemplary embodiment and the first exemplary embodiment. For this reason, descriptions for step S150 will be omitted. To put it briefly, the DMA control circuit 115 transfers the received data through DMA transfer.

(Step S160)

The DMA control circuit 115 writes status information. The DMA control circuit 115 generates status information on the received data which is transferred through the DMA transfer. The DMA control circuit 115 writes the status information to the R/W descriptor storage circuit 200.

(Step S170)

The circuit 132 for controlling the number of remaining descriptors makes a judgment on the number of remaining descriptors. The judgment on the number of remaining descriptors is a judgment on whether or not all the "J" descriptors stored in the R/W descriptor storage circuit 200 have been used through DMA transfer. The rest of the operation made in this step is identical between the third exemplary embodiment and the first exemplary embodiment. For this reason, descriptions for the rest thereof will be omitted.

(Step S180 to Step S190)

Steps S180 to S190 are identical between the third exemplary embodiment and the first exemplary embodiment. For this reason, descriptions for steps S180 to S190 will be omitted. To put it briefly, the time management circuit 131 judges whether or not the threshold time "T" has lapsed away (step S180), and the time management circuit 131 judges whether or not received data has been received (step S190).

(Step S200)

The reception controller 114 updates the parameters. If data has been received, then the reception controller updates the parameters in order to perform a reception process on the data. The reception controller 114 updates the descriptor pointer "L" in the R/W descriptor storage circuit 200 in a way that "L=L+1." The rest of the operation made in this step is identical between the third exemplary embodiment and the first exemplary embodiment. For this reason, descriptions for the rest thereof will be omitted.

(Step S210 to Step S220)

Steps S210 to S220 are identical between the third exemplary embodiment and the first exemplary embodiment. For this reason, descriptions for steps S210 and S220 will be omitted. To put it briefly, the circuit 133 for judging the valid descriptors judges whether or not the reception process has been performed on the basis of at least one descriptor (step S210). The circuit 132 for controlling the number of remaining descriptors updates the number of processed received descriptors (step S220).

(Step S230)

The DMA control circuit 115 transfers the reception status from the R/W descriptor storage circuit 200 to the external memory 101 through DMA transfer. The DMA control circuit 115 acquires the status information which is stored in the R/W descriptor storage circuit 200, and thus transfers the status information to the address "I" in the descriptor area 140 of the external memory 101 through DMA transfer. Thereby, the external memory 101 stores the combined reception statuses in the address "I" in the descriptor storage 140.

(Step S240)

Step S230 according to the third exemplary embodiment is a replacement for steps S230 and S240 according to the first exemplary embodiment. For this reason, step S240 is deleted in the third exemplary embodiment.

(Step S250)

Step S250 is identical between the third exemplary embodiment and the first exemplary embodiment. For this reason, descriptions for step S250 will be omitted. To put it briefly, the reception status combination circuit 134 judges whether or not it is on the basis of the judgment made by the circuit 133 for judging the number of valid descriptors that the reception status combination circuit 134 has performed the process of combining the reception statuses (step S250).

(Step S260)

The reception controller 114 updates the parameters. The reception controller 114 the descriptor pointer "L" in the R/W descriptor storage circuit 200 in a way that "L=1." The rest of the operation made in this step is identical between the third exemplary embodiment and the first exemplary embodiment. For this reason, descriptions for the rest thereof will be omitted.

(Step S270)

The reception controller 114 updates the parameters. The reception controller 114 updates the descriptor pointer "L" in the R/W descriptor storage circuit 200 in a way that "L=L+1." The rest of the operation made in this step is identical between the third exemplary embodiment and the first exemplary embodiment. For this reason, descriptions for the rest thereof will be omitted.

Note that, although the foregoing descriptions have been provided for the difference between the operational flow according to the third exemplary embodiment and the operational flow (shown in FIGS. 5A and 5B) according to the first exemplary embodiment, the same difference can be also applied to the operational flow (shown in FIGS. 8A and 8B) according to the second exemplary embodiment as described above.

As have been described above, in the network processor according to the third exemplary embodiment, the reception controller 114 includes the R/W descriptor storage circuit 200 in lieu of the descriptor storage circuit 116 and the reception status storage circuit 118 which have been described with respect to the first and second exemplary embodiments. The R/W descriptor storage circuit 200 stores the descriptors and the reception statuses. This configuration makes the network processor according to the third exemplary embodiment serve the purpose, as long as the network processor includes only the R/W descriptor storage circuit 200 in lieu of the descriptor storage circuit 116 and the reception status storage circuit 118. Accordingly, it is possible to simplify the circuit configuration.

The descriptions have been provided by referring to the exemplary embodiments. According to the first exemplary embodiment of the present invention, the reception controller 114 combines multiple sets of status information on the received data, and thus transfers the combined sets of status information to the external memory 101 through DMA transfer. For example, the multiple sets of status information are transferred to the external memory as a whole through DMA transfer. This makes it possible to inhibit the memory bus 102 from being occupied by the DMA transfer performed by the reception controller 114. Accordingly, it is possible to prevent the reduction in the transfer efficiency with which the received data is transferred through DMA transfer. In addition, even when incoming data is received in frames each with a shorter length in fast-speed communications, it is possible to prevent the incoming data from being discarded due to the shortage of the band of the memory bus 102.

In addition, in the second exemplary embodiment of the present invention, the reception controller 114 further includes the circuit 135 for controlling the number of received data bytes in the reception status combination control circuit 117. The reception status combination control circuit 117 controls an operation of combining reception statuses on the basis of the number of received data bytes. This makes it possible to combine a larger number of reception statuses, when incoming data is received in frames each with such a shorter length that the band of the memory bus 102 is more likely to be occupied in fast-speed communications. On the other hand, this makes it possible to combine a smaller number of reception statuses, when incoming data is received in frames each with a longer length. Accordingly, it is possible to reduce the stay time of the reception statuses to a certain length of time.

Moreover, according to the third exemplary embodiment of the present invention, the reception controller 114 includes the R/W descriptor storage circuit 200 in lieu of the descriptor storage circuit 116 and the reception status storage circuit 118. This makes it possible to simplify the circuit configuration.

In this respect, descriptions will be provided for the effects of the present invention by use of mathematical expressions. Let us assume that: reception processes are respectively performed on 8 sets of received data; and 8 reception statuses are recorded in the external memory 101. The occupied time "t" for which the memory bus 102 is accessed is expressed with the following mathematical expressions where: "A" denotes a length of time needed for a command to be issued to the external memory 101; "B" denotes a length of time needed for the descriptors to be read from the external memory 101 through DMA transfer; "C" denotes a length of time needed for the sets of the received data to be transferred to the external memory 101 through DMA transfer; and "D" denotes a length of time needed for the receptions statuses to be written to the external memory 101.

For instance, with regard to the prior art (Patent Document), $$t=(A+B)+((A+C)\times 8)+((A+D)\times 8)=17A+B+8C+8D.$$

On the other hand, with respect to the present invention, $$t=(A+B)+((A+C)\times 8)+(A+D\times 8)=10A+B+8C+8D.$$

In short, the present invention makes it possible to reduce the number of multiplications of the length of time "A" needed for a command to be issued to the external memory 101 from the 17 times in the prior art to the 10 times in the present invention. In this manner, the present invention makes it possible to prevent the band of the memory bus 102 from being occupied, because the present invention causes the reception statuses to be transferred to the external memory 101 through DMA transfer after combining the reception statuses.

Referring to the exemplary embodiments, the foregoing descriptions have been provided for the present invention as claimed in the application concerned. However, the present invention as claimed in the application concerned is not limited to the above-described exemplary embodiments. Various modifications which can be understood by those skilled in the art can be applied to the configuration and the details of the present invention as claimed in the application concerned within the scope of the invention.

Further, it is noted that Applicant's intent is to encompass equivalents of all claim elements, even if amended later during prosecution.

What is claimed is:

1. A network processor, comprising:
a descriptor storage circuit which stores a plurality of descriptors stored on an external memory, the external memory including a plurality of storage areas storing a plurality of received data, a descriptor specifying a location of a storage area;
a DMA (Direct Memory Access) control circuit configured to transfer the plurality of descriptors from the external memory to the descriptor storage circuit through a DMA transfer, to transfer the plurality of received data to the plurality of storage areas in the external memory through the DMA transfer on a basis of the plurality of descriptors stored in the descriptor storage circuit upon receipt of the received data, and to generate a reception status indicating a condition of the received data each time the received data is transferred to the external memory through the DMA transfer;
a reception status storage circuit which stores the reception status; and
a reception status combination control circuit which combines the reception statuses which are stored in the reception status storage circuit,
wherein the DMA control circuit transfers the reception statuses having been combined to the external memory through the DMA transfer, and
wherein the DMA transfer of the reception statuses having been combined is independent of the DMA transfer of the plurality of descriptors.

2. The network processor according to claim 1, wherein the reception status combination control circuit comprises a descriptor validity judging circuit for, upon receipt of the received data, judging whether or not one of the plurality of descriptors to be used by the DMA control circuit to transfer the received data through DMA transfer, is valid, and
wherein when the descriptor validity judging circuit judges that the one descriptor is valid, the DMA control circuit transfers the received data to the external memory through the DMA transfer on a basis of the one descriptor.

3. The network processor according to claim 2, wherein the reception status combination control circuit comprises:
a reception status combination circuit which combines the reception statuses which are stored in the reception status storage circuit; and
a valid descriptor number judgment circuit which judges a number of valid descriptors, which is configured to judge whether or not the DMA control circuit has transferred the received data through the DMA transfer by use of at least one valid descriptor, on a basis of a judgment made by the descriptor validity judging circuit, and
wherein the reception status combination circuit combines the reception statuses which are stored in the reception status storage circuit, when the descriptor validity judging circuit judges that the one descriptor comprises an invalid descriptor, and concurrently when the valid descriptor number judgment circuit judges that the DMA control circuit has transferred the received data through the DMA transfer by use of at least one valid descriptor.

4. The network processor according to claim 3, wherein the reception status combination control circuit further comprises a remaining descriptor number control circuit which controls a number of remaining descriptors, which is configured to judge whether or not the DMA control circuit has used all the plurality of descriptors to transfer the received data through the DMA transfer, and
wherein the reception status combination circuit combines the reception statuses which are stored in the reception status storage circuit, when the DMA control circuit is judged as having used all the plurality of descriptors to transfer the received data through the DMA transfer.

5. The network processor according to claim 4, wherein the reception status combination control circuit further comprises a time management circuit configured to measure a predetermined fixed time after the received data is received, and to judge whether or not the fixed time has lapsed at an interval between the reception of the received data and the reception of subsequent new received data, and
wherein the reception status combination circuit combines the reception statuses which are stored in the reception status storage circuit, when the time management circuit judges that the fixed time has lapsed.

6. The network processor according to claim 5, wherein the reception status combination control circuit further comprises a data bytes number control circuit which controls a number of received data bytes which is configured to count a number of cumulative data bytes of the received data when the received data is received, and to judge whether or not the number of cumulative data bytes exceeds a predetermined threshold value for the number of cumulative data bytes, and
wherein the reception status combination circuit combines the reception statuses, which are stored in the reception status storage circuit, when the data bytes number control circuit judges that the number of cumulative data bytes exceeds the threshold value of the number of cumulative data byte numbers.

7. A reception controller comprising the DMA control circuit, the descriptor storage circuits, the reception status storage circuit and the reception status combination control circuit in the network processor according to claim 1.

8. The network processor according to claim 1, wherein the DMA control circuit transfers the reception statuses having been combined to the external memory m(m>0) times through the DMA transfer, if the DMA control circuit transfers the received data to the external memory n(n>0) times through the DMA transfer, and
wherein m is less than n.

9. A data reception processing method for a network processor connected to an external memory which includes a plurality of storage areas for storing a plurality of received data, and stores a plurality of descriptors specifying locations of the plurality of storage areas, respectively, the method comprising:
storing a plurality of descriptors;
transferring the plurality of descriptors from the external memory through a DMA (Direct Memory Access) transfer;
receiving the plurality of received data;
transferring the plurality of received data to the storage areas in the external memory through the DMA transfer by use of the plurality of descriptors,
wherein each time the received data is transferred to the external memory through the DMA transfer, generating a reception status indicating a condition of the received data;
storing the reception status in a reception status storage circuit;
combining the reception statuses which are stored in the reception status storage circuit; and
transferring the reception statuses having been combined to the external memory through the DMA transfer,
wherein the DMA transfer of the reception statuses having been combined is independent of the DMA transfer of the plurality of descriptors.

10. The data reception processing method according to claim 9, further comprising upon receipt of the received data, judging whether or not one of the descriptors to be used to transfer the received data through the DMA transfer, is valid,
wherein the transferring the received data to the storage areas in the external memory through the DMA transfer comprises, when the one descriptor is judged as valid, transferring the received data to the external memory through DMA transfer on a basis of the one descriptor.

11. The data reception processing method according to claim 10, further comprising judging whether or not a DMA control circuit has transferred the received data through the DMA transfer by use of at least one valid descriptor, wherein combining the stored reception statuses comprises combining the stored reception statuses when the one descriptor is judged as an invalid descriptor, and concurrently when the DMA control circuit is judged as having transferred the received data through the DMA transfer by use of at least one valid descriptor.

12. The data reception processing method according to claim 11, further comprising judging whether or not all the plurality of descriptors have been used to transfer the received data through the DMA transfer,
wherein combining the stored reception statuses comprises combining the stored reception statuses when all the plurality of descriptors are judged as having been used to transfer the received data through the DMA transfer.

13. The data reception processing method according to claim 12, further comprising measuring a predetermined fixed time after the received data is received, and judging whether or not the fixed time has lapsed since the received data is received until subsequent new received data is received,
wherein combining the stored reception statuses comprises combining the stored reception statuses when a time management circuit judges that the fixed time has lapsed.

14. The data reception processing method according to claim 13, further comprising counting a number of cumulative data bytes of the received data when the received data is received, and judging whether or not the number of cumulative data bytes exceeds a predetermined threshold value for the number of cumulative data bytes,
wherein the combining the stored reception statuses comprises combining the stored reception statuses when the number of cumulative data bytes exceeds the threshold value of the number of cumulative data byte numbers.

15. The data reception processing method according to claim 9, wherein the DMA transfer of the reception statuses having been combined to the external memory occurs m(m>0) times through the DMA transfer, if the DMA transfer of plurality of received data to the plurality of storage areas in the external memory occurs n(n>0) times through the DMA transfer, and
wherein m is less than n.

16. A data reception processing method, comprising:
receiving a plurality of data from an external device and transmitting the plurality of data to a plurality of data storage areas in an external memory, based on a plurality of descriptors, by a direct memory access (DMA) transfer, each of the plurality of descriptors linking to a corresponding one of the plurality of data storage areas, each of the plurality of descriptors including valid/invalid information thereof, and address information corresponding to the respective data storage areas;
storing a reception status corresponding to a data received from the external device into a reception status storage circuit, every time the data is received, so that a plurality of reception statuses corresponding to the plurality of data are stored when the plurality of data is received, the reception status including a reception frame error information and a reception frame length information; and
transferring the plurality of reception statuses in the reception status storage circuit into the external memory, as a whole, by the DMA transfer, after the plurality of data are transferred to the external memory,
wherein the DMA transfer of the plurality of reception statuses as a whole is independent of the DMA transfer based on the plurality of descriptors.

17. The data reception processing method according to claim 14, wherein the DMA transfer of the plurality of reception statuses as a whole the external memory occurs m(m>0) times through the DMA transfer, if the DMA transfer of the plurality of received data to the plurality of data storage areas in the external memory occurs n(n>0) times through the DMA transfer, and
wherein m is less than n.

* * * * *